(12) United States Patent
Takagi et al.

(10) Patent No.: US 11,562,188 B2
(45) Date of Patent: Jan. 24, 2023

(54) PRINTED IMAGE INSPECTION DEVICE AND PRINTING APPARATUS INCLUDING SAME

(71) Applicant: SCREEN HOLDINGS CO., LTD., Kyoto (JP)

(72) Inventors: Yuya Takagi, Kyoto (JP); Makoto Narazaki, Kyoto (JP); Takaharu Yamamoto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/690,433

(22) Filed: Mar. 9, 2022

(65) Prior Publication Data
US 2022/0309298 A1 Sep. 29, 2022

(30) Foreign Application Priority Data
Mar. 25, 2021 (JP) .............................. JP2021-051102

(51) Int. Cl.
| | | |
|---|---|---|
| G06K 15/02 | (2006.01) | |
| G06T 7/00 | (2017.01) | |
| G06T 7/90 | (2017.01) | |
| G06K 15/10 | (2006.01) | |
| G06K 15/16 | (2006.01) | |

(52) U.S. Cl.
CPC .......... *G06K 15/027* (2013.01); *G06K 15/102* (2013.01); *G06T 7/0004* (2013.01); *G06T 7/90* (2017.01); *G06K 15/16* (2013.01); *G06T 2207/30144* (2013.01)

(58) Field of Classification Search
CPC .... G06K 15/027; G06K 15/102; G06K 15/16; G06T 7/90; G06T 7/0004; G06T 2207/30144
See application file for complete search history.

(56) References Cited

U.S. PATENT DOCUMENTS

| | | | |
|---|---|---|---|
| 2005/0151985 A1* | 7/2005 | Hisamura | H04N 1/00045 399/407 |
| 2012/0044540 A1 | 2/2012 | Dalal et al. | |
| 2015/0350493 A1 | 12/2015 | Sakatani | |
| 2016/0269598 A1 | 9/2016 | Hayashi et al. | |
| 2019/0358978 A1* | 11/2019 | Yamamoto | B41J 13/076 |

FOREIGN PATENT DOCUMENTS

| | | |
|---|---|---|
| EP | 1 894 724 A2 | 3/2008 |
| JP | 2013-184442 A | 9/2013 |
| JP | 2019-202512 A | 11/2019 |

* cited by examiner

*Primary Examiner* — Quang N Vo
(74) *Attorney, Agent, or Firm* — McDermott Will & Emery LLP

(57) ABSTRACT

In a printing apparatus, a colorimeter is provided for performing imaging calibration on an inline scanner for inspecting a printed image. During a printing operation, the inline scanner captures a test pattern image formed on paper and thereby obtains calibration imaging data, the colorimeter performs color measurement on the test pattern image and thereby obtains calibration colorimetric data, both data are used to update a correction factor LUT for imaging calibration, and the correction factor LUT is used to perform imaging calibration on the inline scanner.

13 Claims, 17 Drawing Sheets

PRINTED IMAGE INSPECTION DEVICE AND PRINTING APPARATUS INCLUDING SAME

BACKGROUND OF THE INVENTION

Field of the Invention

The present invention relates to a printed image inspection device for inspecting a printed image and a printing apparatus including the same.

Description of the Related Art

A known printed image inspection device inspects a printed image formed on a base material, such as printing paper, in a printing apparatus, based on imaging data obtained by an imaging portion, such as a contact image sensor (CIS), capturing the printed image. There is also known a printing apparatus including such a printed image inspection device. In order to maintain good accuracy for printed image inspection, such a printed image inspection device is required to properly perform imaging calibration on the CIS serving as the imaging portion.

On the other hand, conventional printed image inspection devices capture images of a blank area of paper used as a base material with lights on and off before printing, and calibrate the CIS based on the captured images.

In relation to the printed image inspection device, etc., disclosed in this application, Japanese Laid-Open Patent Publication No. 2013-184442 discloses a recording device having the function of performing color calibration and equipped with a first sensor unit including a density sensor, and a holding portion for detachably holding a second sensor unit including a spectrophotometric sensor. This recording device also includes a control portion configured to enable the execution of calibration using the second sensor unit when the holding portion is holding the second sensor unit, and also enable the execution of calibration using the first sensor unit when the holding portion is not holding the second sensor unit. Note that Japanese Laid-Open Patent Publication No. 2013-184442 describes the color calibration function as including the following: recording color patches on a recording medium using printheads; performing color measurement on the color patches; and performing color correction on input image data based on the color measurement results (paragraph [0003]).

In the case where the imaging portion (CIS) performs imaging calibration for printed image inspection using images captured with lights on and off, as described above, printed image inspection cannot be performed with lights off. Further, in the case of capturing images of a blank area of paper for calibration during printing, the blank area is not large enough to cover the area of the CIS in the form of an inline scanner. Under these circumstances, it is not practical to perform imaging calibration on the CIS during printing.

On the other hand, the imaging sensitivity of the CIS is affected by temperature and other factors. Therefore, if printing is continued for a long period of time, the imaging sensitivity of the CIS might change due to environmental changes, such as temperature changes, leading to a failure in faithfully capturing printed images.

SUMMARY OF THE INVENTION

Therefore, it is desired to provide a printed image inspection device, etc., capable of faithfully capturing printed images and inspecting the printed images with high accuracy, even if printing is continued for a long period of time.

A first aspect of the present invention provides a printed image inspection device for inspecting a printed image formed by a printing apparatus, including:

an imaging portion configured to capture the printed image;

a colorimeter configured to perform color measurement on a whole or part of the printed image;

a calibration portion configured to perform imaging calibration on the imaging portion;

a determination portion configured to determine the quality of the printed image; and an inspection control portion configured to control the imaging portion, the colorimeter, and the calibration portion, wherein, the inspection control portion controls the imaging portion, the colorimeter, and the calibration portion such that, when a test pattern image for imaging calibration of the imaging portion is formed as a part or whole of the printed image, the imaging portion captures the test pattern image and thereby generates test pattern imaging data, the colorimeter performs color measurement on the test pattern image and thereby generates colorimetric data, and the calibration portion generates imaging calibration data based on the test pattern imaging data and the colorimetric data, the inspection control portion controls the calibration portion such that, after the imaging calibration data is generated, the calibration portion corrects target imaging data based on the imaging calibration data, the target imaging data being generated by the imaging portion capturing a target printed image formed based on print data representing an input image to be printed, and the determination portion determines the quality of the target printed image based on the target imaging data corrected by the calibration portion.

A second aspect of the present invention provides a printing apparatus having a printed image inspection function, including:

a printing mechanism; and a printed image inspection device according to the first aspect of the invention, wherein, the printing mechanism includes:

a transport mechanism configured to transport a base material;

printheads configured to print on a printing side of the base material; and a printing control portion configured to control the printheads and the transport mechanism to form a printed image on the base material, the transport mechanism includes first and second transport rollers partially wrapped by the base material such that the first and second transport rollers change a transport direction of the base material with the printed image, the imaging portion is disposed with an imaging surface thereof facing the printing side of the base material at a portion where the base material is in contact with the first transport roller, and the colorimeter is disposed with a color detection surface thereof facing the printing side of the base material at a portion where the base material is in contact with the second transport roller.

A third aspect of the present invention provides a printed image inspection method for inspecting a printed image formed by a printing apparatus, including:

an imaging step of capturing the printed image;

a color measurement step of performing color measurement on a whole or part of the printed image;

a calibration step of performing imaging calibration on the imaging portion; and a determination step of determining the quality of the printed image, wherein, when a test pattern image for imaging calibration in the imaging step is formed as a part or whole of the printed image, test pattern imaging data, colorimetric data, and imaging calibration data are generated as follows:

the test pattern imaging data is generated by the test pattern image being captured in the imaging step;

the colorimetric data is generated by the test pattern image being subjected to color measurement in the color measurement step; and the imaging calibration data is generated based on the test pattern imaging data and the colorimetric data in the calibration step, after the imaging calibration data is generated, target imaging data is corrected based on the imaging calibration data in the calibration step, the target imaging data being generated in the imaging step by capturing a target printed image formed based on print data representing an input image to be printed, and the quality of the target printed image is determined in the determination step based on the target imaging data corrected in the calibration step.

Next, effects of the above aspects of the invention will be described. In the first aspect of the invention, when a test pattern image for imaging calibration of the imaging portion is formed as a part or whole of a printed image, the imaging portion captures the test pattern image and thereby generates test pattern imaging data, the colorimeter performs color measurement on the test pattern image and thereby generates colorimetric data, and based on the test pattern imaging data and the colorimetric data, imaging calibration data is generated. After the imaging calibration data is generated, when the imaging portion captures a target printed image formed based on print data representing an input image to be printed and thereby generates target imaging data, the target imaging data is corrected based on the imaging calibration data, and the quality of the target printed image is determined based on the corrected target imaging data. In this configuration, when a test pattern image is formed as a printed image, imaging calibration is performed on the imaging portion even during the printing operation by using colorimetric data for the test pattern image, and therefore, even if the imaging sensitivity of the imaging portion varies due to environmental changes, such as temperature changes, during the printing operation, imaging calibration can be accurately performed in real time in response to such variations. As a result, when the density of a target printed image formed on the base material varies during the printing operation, such density variations can be properly detected based on imaging data obtained by the imaging portion capturing the target printed image.

In the printing apparatus having the printed image inspection function according to the second aspect of the invention, the transport mechanism configured to transport the base material includes the first and second transport rollers partially wrapped by the base material such that the first and second transport rollers change the transport direction of the base material with the printed image. The imaging portion adapted for printed image inspection is disposed with the imaging surface facing the printing side of the base material at the portion where the base material is in contact with the first transport roller. The colorimeter adapted for imaging calibration is disposed with the color detection surface facing the printing side of the base material at the portion where the base material is in contact with the second transport roller. This arrangement of the imaging portion and the colorimeter prevents imaging and color measurement positions from being displaced due to fluttering and/or cockling of the base material being transported, so that imaging and color measurement can be performed stably and well on printed images formed on the base material. This allows more accurate imaging calibration of the imaging portion and hence more faithful capturing of the target printed image, thereby enhancing the effects achieved by the first aspect of the invention.

The third aspect of the invention renders it possible to achieve effects similar to those achieved by the first aspect of the invention.

The above and other objects, features, modes, and effects of the invention will become more apparent from the following detailed description of the invention with reference to the accompanying drawings.

DETAILED DESCRIPTION OF THE INVENTION

Hereinafter, embodiments of the present invention will be described with reference to the accompanying drawings.

1. FIRST EMBODIMENT 1.1 Overall Configuration

Figure 1:
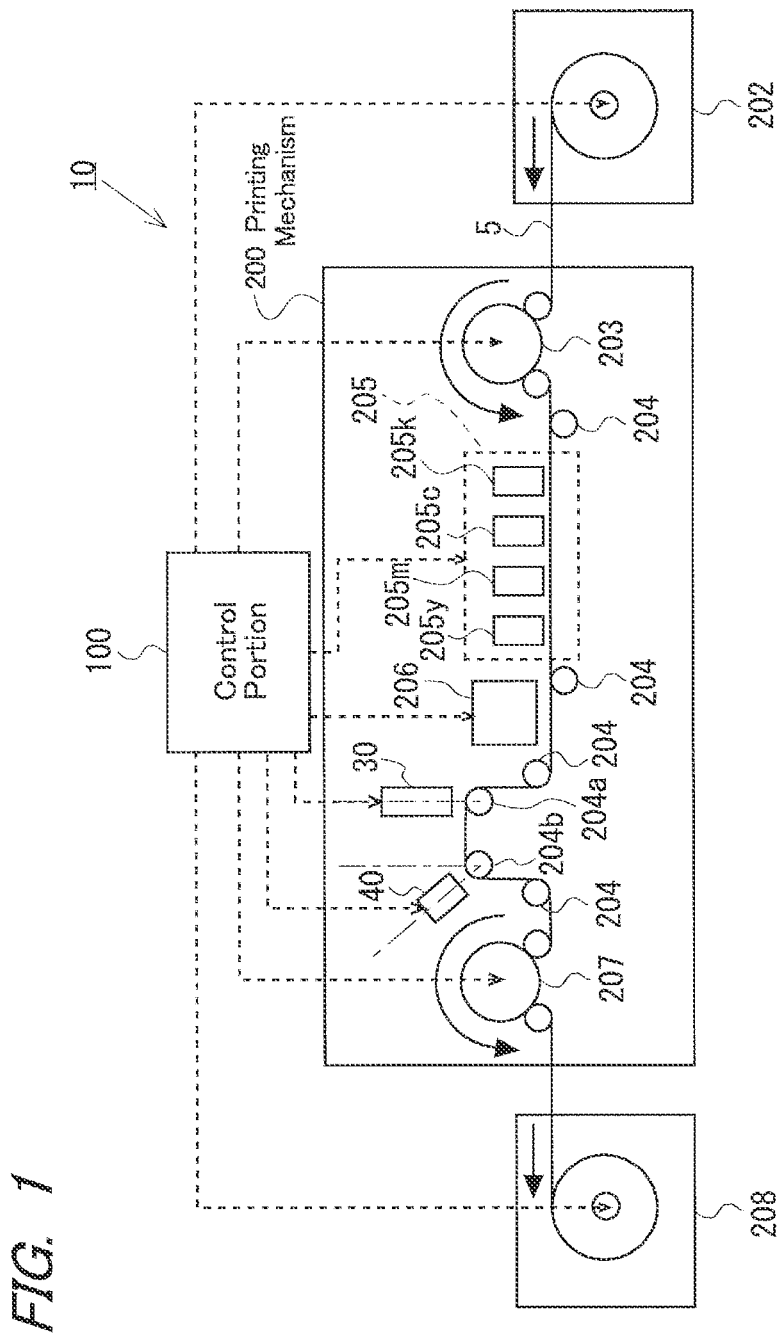
FIG. 1 is a schematic diagram illustrating the configuration of an inkjet printing apparatus according to a first embodiment of the present invention.

FIG. 1 is a schematic diagram illustrating the configuration of an inkjet printing apparatus 10 according to a first embodiment of the present invention. The printing apparatus 10 includes a paper feeding portion 202 configured to unwind and supply recording paper (simply referred to below as "paper") 5, which is a long base material, from a web of paper, which is a roll of printing base material (simply referred to below as "base material"), a first drive roller 203 configured to transport the paper 5 into a printing mechanism 200, a plurality of support rollers 204 configured to transport the paper 5 inside the printing mechanism 200, a recording portion 205 configured to perform printing by ejecting ink onto the paper 5, a drying portion 206 configured to dry the paper 5 after printing, a second drive roller 207 configured to eject the paper 5 from inside the printing mechanism 200, and a paper winding portion 208 configured to wind the paper 5 after printing. Further included are an imaging support roller 204a and a color measurement support roller 204b, which, while functioning as support rollers, enable imaging and color measurement to be performed stably and well on a printed image formed on the paper 5 by the recording portion 205 (details will be described later).

The first drive roller 203, the support rollers 204, 204a, and 204b, and the second drive roller 207 constitute a transport mechanism for moving the paper 5. The recording portion 205 includes first through fourth printhead arrays 205k, 205c, 205m, and 205y, which eject black (K), cyan (C), magenta (M), and yellow (Y) ink, respectively. In addition, the printing mechanism 200 includes an inline scanner 30 as an imaging portion configured to capture a printed image formed on the paper 5 by the recording portion 205, and a colorimeter 40 configured to perform color measurement on a predetermined portion of the printed image. The inline scanner 30 and the colorimeter 40 respectively obtain imaging data and colorimetric data to be sent to a control portion 100.

1.2 Configuration of the Control Portion

Figure 2:
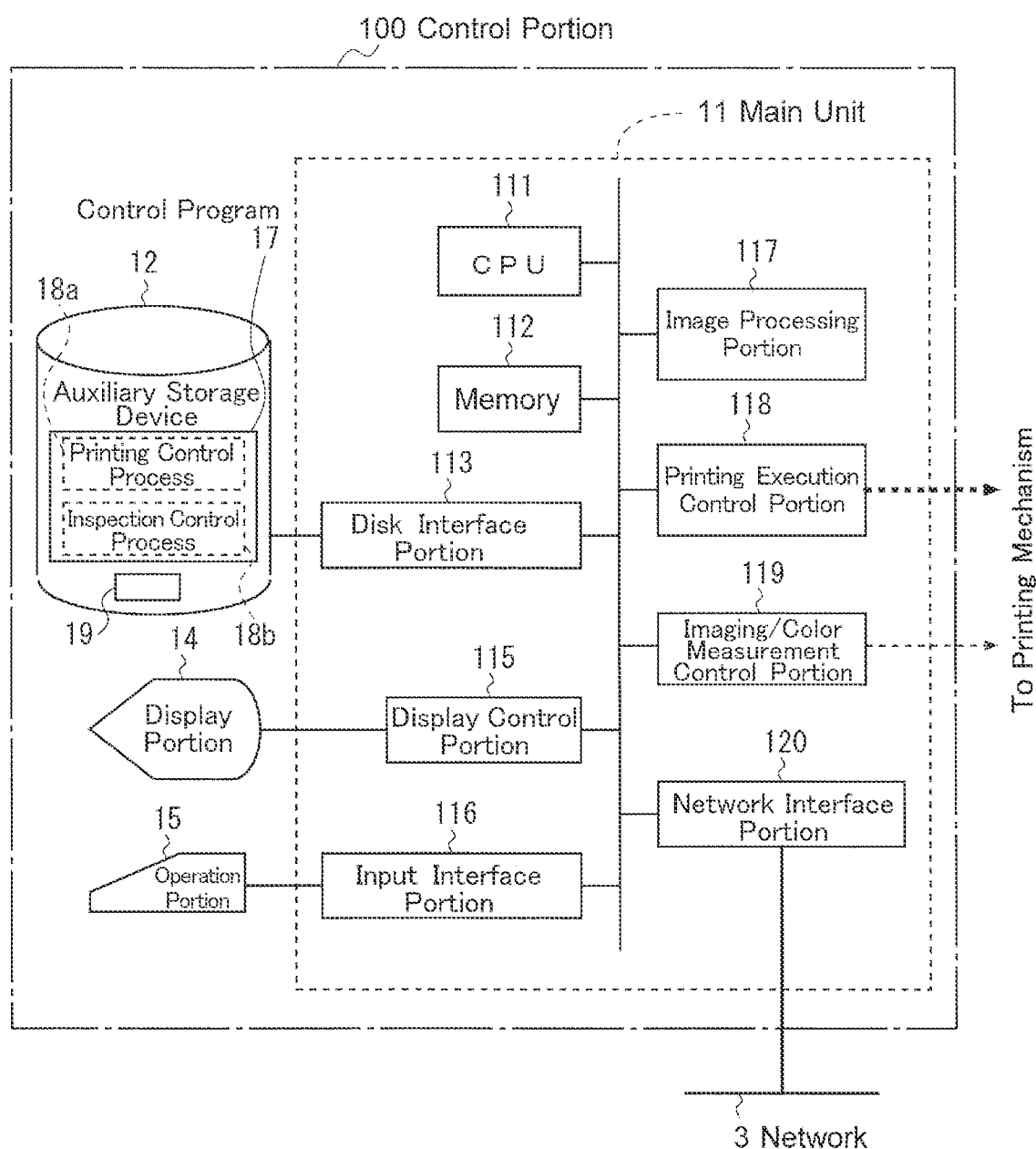
FIG. 2 is a block diagram illustrating the hardware configuration of a control portion in the first embodiment.

FIG. 2 is a block diagram illustrating the hardware configuration of the control portion 100 in the inkjet printing apparatus 10. The control portion 100 includes a main unit 11, an auxiliary storage device 12, a display portion 14, and an operation portion 15. The main unit 11 includes a CPU 111, memory 112, a disk interface portion 113, a display control portion 115, an input interface portion 116, an image processing portion 117, a printing execution control portion 118, an imaging/color measurement control portion 119, and a network interface portion 120. The CPU 111, the memory 112, the disk interface portion 113, the display control portion 115, the input interface portion 116, the image processing portion 117, the printing execution control portion 118, the imaging/color measurement control portion 119, and the network interface portion 120 are connected to one another via a system bus. The disk interface portion 113 is connected to the auxiliary storage device 12. The display control portion 115 is connected to the display portion 14. The input interface portion 116 is connected to the operation portion 15, which includes a keyboard, a mouse, etc. The network interface portion 120 is connected to the network 3, via which the control portion 100 is connected to a host device, etc. The auxiliary storage device 12 is a magnetic disk device or the like. The display portion 14 is a liquid crystal display or the like. The display portion 14 is used to display information desired by the operator. The operation portion 15 is used by the operator to input an instruction to the inkjet printing apparatus 10.

The auxiliary storage device 12 has stored therein a control program 17 for generating print data from manuscript data received via the network 3 and causing the printing mechanism 200 to print an image represented by the print data. As described earlier, the printing mechanism 200 is equipped with the inline scanner 30 serving as the imaging portion for capturing a printed image formed on the paper 5, and also equipped with the colorimeter 40 configured to perform color measurement on the printed image. The control program 17 is a program used for performing a printing control process 18a for generating print data and causing the printing mechanism 200 to print an image based on the print data, as described above, and an inspection control process 18b for determining the quality of the printed image using the inline scanner 30 and the colorimeter 40. The auxiliary storage 12 has also stored therein a correction factor lookup table (LUT) 19 to be used in the inspection control process 18b, as will be described later. The CPU 111 executes the control program 17 stored in the auxiliary storage device 12 after reading the control program 17 into the memory 112, and thereby realizes the function of forming a printed image on the paper 5 and the function of determining the quality of the printed image in the inkjet printing apparatus 10. The memory 112 includes a random-access memory (RAM) and a read-only memory (ROM). The memory 112 functions as a work area for the CPU 111 to execute the control program 17. Further, when the control program 17 is executed, the correction factor LUT 19 is also stored in the memory 112 serving as the work area, and accessed in the inspection control process 18b. The details of the correction factor LUT 19 will be described later.

Under control of the CPU 111 executing the control program 17, the image processing portion 117 generates print data in bitmap format by rasterizing manuscript data written in a page description language. The printing execution control portion 118 functions as an interface for the CPU 111 executing the control program 17 to control various portions of the printing mechanism 200. The imaging/color measurement control portion 119 functions as an interface for the CPU 111 executing the control program 17 to control the inline scanner 30 and the colorimeter 40 to perform imaging and color measurement, respectively, on the printed image formed on the paper 5.

1.3 Inline Scanner, Colorimeter, and Arrangement Thereof

Figure 3:
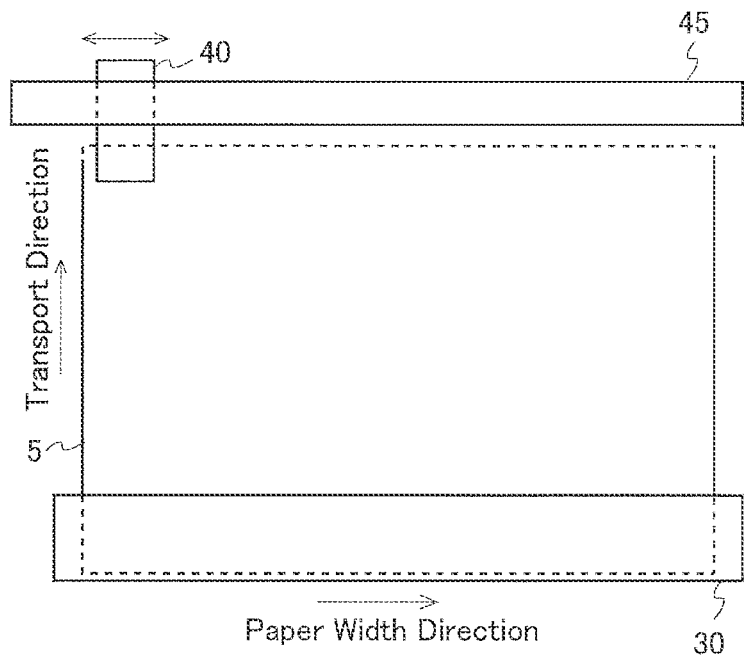
FIG. 3 is a plan view for describing the arrangement of an inline scanner (imaging portion) and a colorimeter in the first embodiment.
Figure 4:
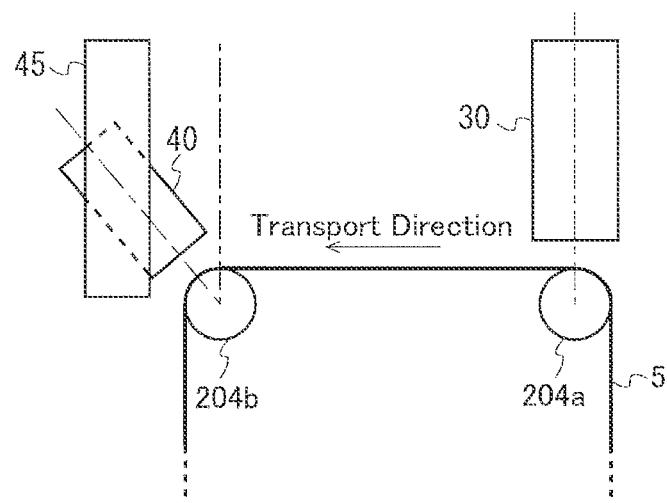
FIG. 4 is a side view for describing the arrangement of the inline scanner and the colorimeter in the first embodiment.

FIG. 3 is a plan view for describing the arrangement of the inline scanner 30, which serves as the imaging portion, and the colorimeter 40 in the present embodiment. FIG. 4 is a side view (from the left in FIG. 3) for describing the arrangement of the inline scanner 30 and the colorimeter 40 in the present embodiment.

The inline scanner 30 includes a plurality of imaging elements 31 arranged in a width direction (perpendicular to a transport direction of the paper 5 and referred to below as the "paper width direction") of the paper 5, which is the base material, over a length corresponding to the entire width of the paper 5 (see FIG. 5 to be described later). In the present embodiment, the inline scanner 30 is a contact image sensor (CIS), but the inline scanner 30 is not limited thereto and may be a charge-coupled device (CCD) or another type of scanner. Inline scanners, such as the CIS, acquire RGB luminance values using color filters, and output imaging data composed of the RGB luminance values.

On the other hand, the colorimeter 40 can output colorimetric values, such as CMYK density values or Lab values, which provide absolute color information in accordance with the International Commission on Illumination (CIE) or other standards without being affected by environmental factors, such as temperature. Further, the colorimeter 40 is configured to perform spot color measurement on a small area of a printed image that is located at a predetermined position. The colorimeter 40 is moved by a moving mechanism 45 to a position at which to perform color measurement on the printed image. The moving mechanism 45 is configured to allow the colorimeter 40 to move in the paper width direction across at least the entire width of the paper 5. The moving mechanism 45 includes, for example, a guide member for guiding the colorimeter 40, a feed mechanism, such as a rack and pinion or a feed screw, for moving the colorimeter 40, a motor serving as a drive source for the feed mechanism, etc.

The transport mechanism includes the imaging support roller 204a and the color measurement support roller 204b, as described earlier, and the imaging support roller 204a and the color measurement support roller 204b are partially wrapped by the paper 5, as shown in FIG. 4, such that each of the imaging support roller 204a and the color measurement support roller 204b changes the transport direction of the paper 5 with printed images formed by the recording portion 205. Specifically, the transport mechanism is configured such that the imaging support roller 204a switches the transport direction of the paper 5 from vertical to horizontal, and the color measurement support roller 204b switches the transport direction of the paper 5 from horizontal to vertical. Alternatively, the transport mechanism may be conversely configured such that the imaging support roller 204a switches the transport direction of the paper 5 from horizontal to vertical, and the color measurement support roller 204b switches the transport direction of the paper 5 from vertical to horizontal.

In the present embodiment, the inline scanner 30 serving as the imaging portion is disposed with an imaging surface thereof facing a printing side of the paper 5 at a portion where the paper 5 is in contact with the support roller 204a, and the colorimeter 40 is disposed with a color detection surface thereof facing the printing side of the paper 5 at a portion where the paper 5 is in contact with the support roller 204b. Here, the printing side refers to one of two sides of the paper 5 on which the recording portion 205 forms printed images. This arrangement prevents imaging and color measurement positions from being displaced due to fluttering and/or cockling of the paper 5 being transported, so that imaging and color measurement can be performed stably and well on the printed images formed on the paper 5.

Specifically, when assuming that the inline scanner 30 is positioned on a vertical line extending through a point on a central axis of the imaging support roller 204a, as shown in FIG. 4, the imaging surface of the inline scanner 30 is perpendicular to the vertical line. Preferably, the inline scanner 30 is disposed with the imaging surface facing a portion of the printing side that corresponds to a circumferential center of the support roller 204a at the portion where the paper 5 is in contact with the support roller 204a. Further, the colorimeter 40 is disposed with the color detection surface facing a portion of the printing side that corresponds to a circumferential center of the support roller 204b at the portion where the paper 5 is in contact with the support roller 204b. Accordingly, the colorimeter 40 is disposed so as to lie on an oblique line extending from a point on a center axis of the color measurement support roller 204b in a plane perpendicular to the center axis of the colorimeter 204b, as shown in FIG. 4, the oblique line being inclined relative to the vertical direction. The oblique line preferably makes an angle of 30 to 60 degrees with the vertical direction.

In the example shown in FIGS. 1 and 4, the imaging support roller 204a and the color measurement support roller 204b switch the transport direction of the paper 5 between vertical and horizontal, but the transport direction of the paper 5 does not have to be switched between vertical and horizontal so long as the transport direction of the paper 5 is switched by each of the imaging support roller 204a and the color measurement support roller 204b. When assuming that such a transport mechanism configuration is employed, basically the same effects as described above can be achieved by disposing the inline scanner 30 and the colorimeter 40 such that the imaging surface of the inline scanner 30 faces the printing side of the paper 5 at the portion where the paper 5 is in contact with the imaging support roller 204a and the color detection surface of the colorimeter 40 faces the printing side of the paper 5 at the portion where the paper 5 is in contact with the support roller 204b.

1.4 Test Pattern Image for Imaging Calibration

As described earlier, the printing apparatus 10 according to the present embodiment includes the inline scanner 30 and the colorimeter 40, and performs not only the printing control process 18a but also the inspection control process 18b in accordance with the control program 17. Accordingly, in the print control process 18a, the inline scanner 30 captures a printed image formed on the paper 5 and thereby generates imaging data, based on which the quality of the printed image is determined. In order to maintain good accuracy (inspection accuracy) in determining the quality of the printed image, imaging calibration is performed on the inline scanner 30 using colorimetric data obtained by the colorimeter 40. For this calibration, the inline scanner 30 captures a test pattern image for calibration, such as a calibration patch, and the colorimeter 40 performs color measurement on the captured image. Such test pattern images will be described with reference to FIGS. 5 through 8. Note that of the test pattern images shown in FIGS. 5 through 8, the test pattern images shown in FIGS. 5 and 7 can be used in the present embodiment, and the test pattern images shown in FIGS. 6 and 8 are used in a second embodiment to be described later.

Figure 5:
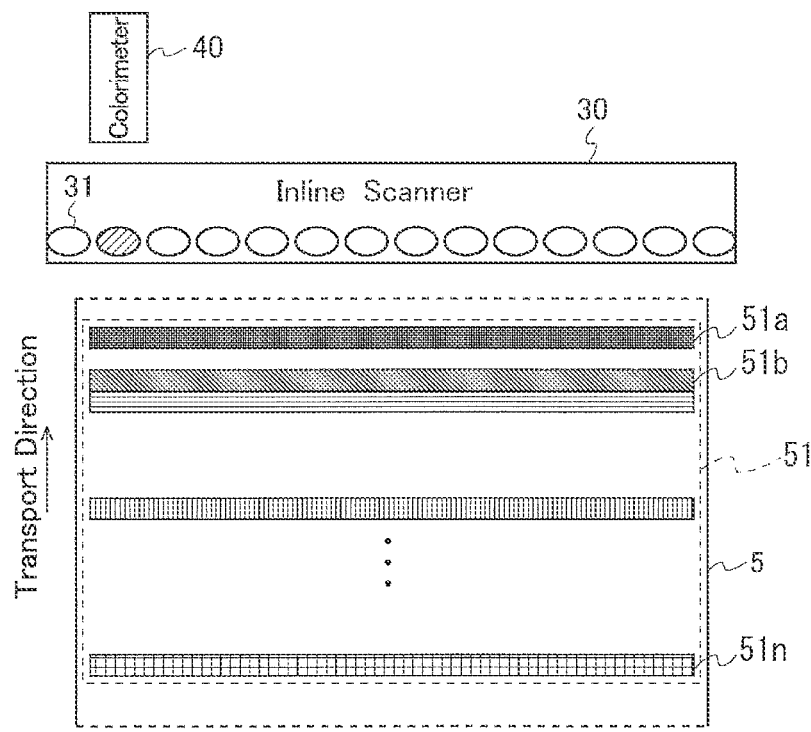
FIG. 5 is a schematic diagram showing a first example of a test pattern image to be read for imaging calibration, along with the inline scanner and the colorimeter.

FIG. 5 is a schematic diagram showing a first example of a test pattern image to be read for imaging calibration of the inline scanner 30 (simply referred to below as "imaging calibration"), along with the inline scanner 30 and the colorimeter 40. In this example, the inline scanner 30 generates test pattern imaging data by capturing a calibration patch, which is a predetermined primary-color portion of a predetermined test pattern image 51 formed as a printed image on the paper 5 by the recording portion 205, as shown in FIG. 5. The calibration patch is subjected to color measurement by the colorimeter 40, resulting in colorimetric data. Based on the test pattern imaging data and the colorimetric data, imaging calibration data for imaging calibration of the inline scanner 30 is generated (details will be described later). Note that the term "primary color" refers to the subtractive primary color yellow (Y), magenta (M), or cyan (C). Such primary-color portions of the test pattern image 51 are formed with constant densities across the width of the paper 5 by the recording portion 205 and arranged in descending order of density (51a, 51b, . . . , 51n), as shown in FIG. 5. Note that instead of using primary-color patches as calibration patches, secondary- or tertiary-color patches may be used. However, in such a case, color system conversion is required for generating imaging calibration data and performing imaging calibration based on the imaging calibration data (details will be described later).

Figure 6:
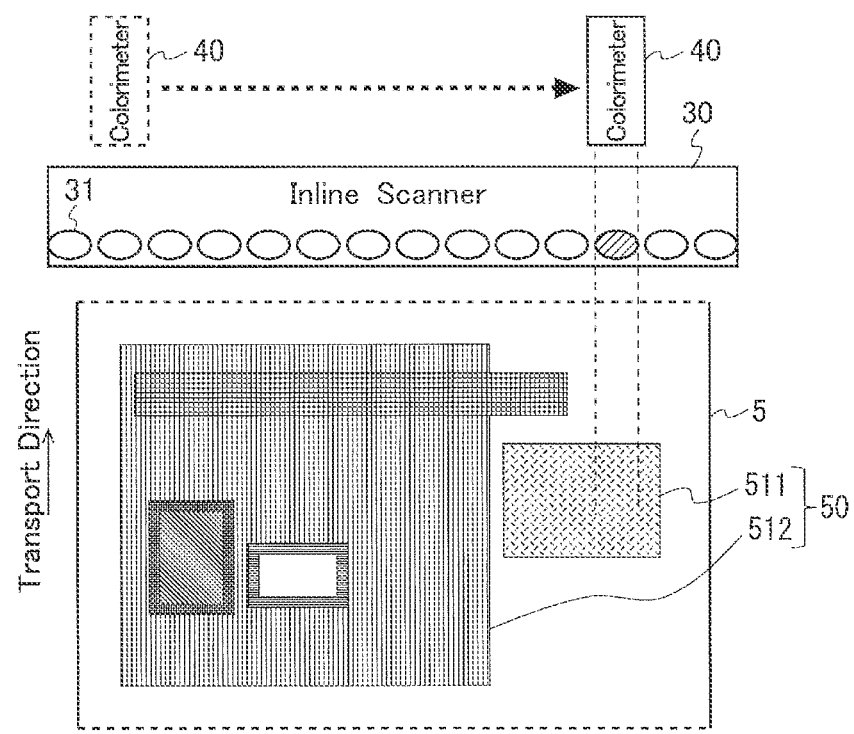
FIG. 6 is a schematic diagram showing a second example of the test pattern image to be read for imaging calibration, along with the inline scanner and the colorimeter.

FIG. 6 is a schematic diagram showing a second example of the test pattern image to be read for imaging calibration of the inline scanner 30, along with the inline scanner 30 and the colorimeter 40. In this example, a test pattern image for imaging calibration of the inline scanner 30 is selected from a printed image (target printed image) formed on the paper 5 by the recording portion 205 based on print data generated from manuscript data, e.g., from a target printed image 50 shown in FIG. 6 (the selected image will be referred to below as the "selected partial image" or simply as the "partial image"). The target printed image 50 includes a partial image 511 and a main image 512 (an image that is to be used as a printed material after the partial image 511 is cut out from the paper 5). After being selected from the target printed image 50, the partial image 511 is captured by some imaging element(s) of the inline scanner 30 as a calibration patch, resulting in test pattern imaging data. The partial image 511 is subjected to color measurement by the colorimeter 40 after the colorimeter 40 is moved to a position where color measurement is possible, whereby colorimetric data is generated. Based on the test pattern imaging data and the colorimetric data, imaging calibration data for imaging calibration of the inline scanner 30 is generated. Here, as for the partial image 511 to be selected from the target printed image 50, the following two conditions need to be satisfied:

(1) The partial image 511 is a pattern image wider than the minimum reading width of each of the inline scanner 30 and the colorimeter 40.

(2) There are as many solid-pattern partial images 511 as the number of patches required for calibrating the CIS that is provided as the inline scanner 30.

Note that the partial image 511 may be automatically selected based on the print data in accordance with a predetermined algorithm, or may be selected by a predetermined input operation.

Figure 7:
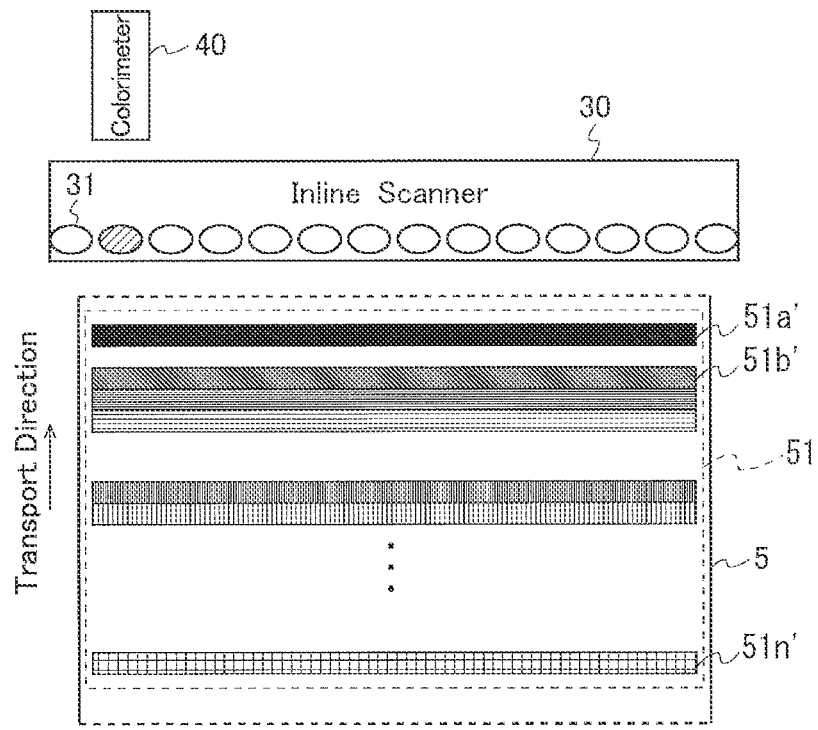
FIG. 7 is a schematic diagram showing a third example of the test pattern image to be read for imaging calibration, along with the inline scanner and the colorimeter.
Figure 8:
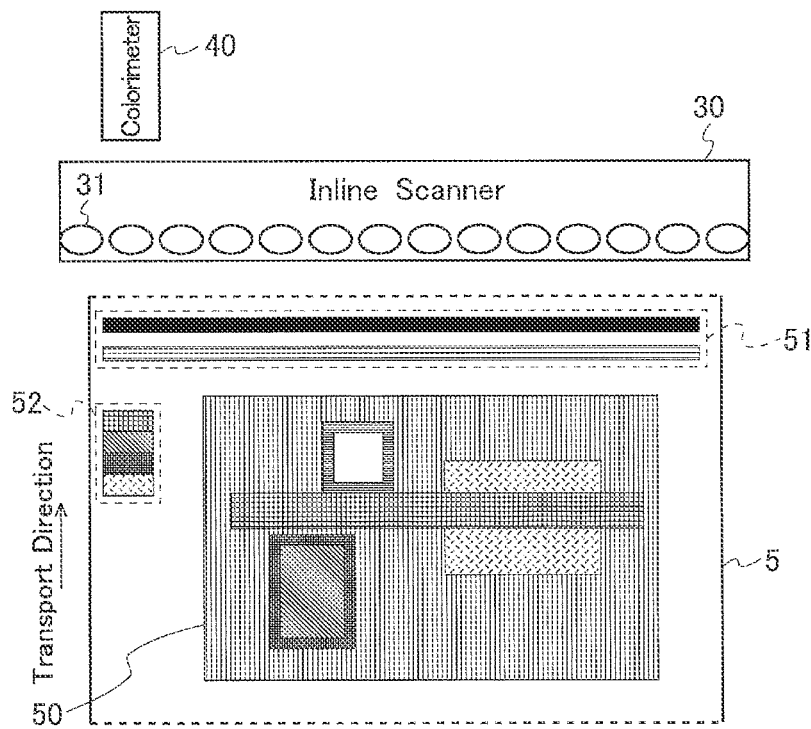
FIG. 8 is a schematic diagram showing a fourth example of the test pattern image to be read for imaging calibration, along with the inline scanner and the colorimeter.

FIG. 7 is a schematic diagram showing a third example of the test pattern image to be read for imaging calibration of the inline scanner 30, along with the inline scanner 30 and the colorimeter 40. In this example, the inline scanner 30 generates test pattern imaging data by capturing a test pattern image 51 for shading correction, as shown in FIG. 7, formed as a printed image on the paper 5 by the recording portion 205. Based on the test pattern imaging data, correction data for shading correction is generated. Here, the term "shading correction" refers to a correction applied to print data, etc., in accordance with characteristics of each printhead of the recording portion 205 in order to inhibit printed images from having uneven densities due to variations in the amounts of ink ejected from the printheads. Note that variations in imaging sensitivity among the imaging elements included in the inline scanner 30 are eliminated by a calibration process which is performed using blank paper before the start of printing, as will be described later (see step S14 in FIG. 9). The calibration here is a relative calibration for eliminating the differences in characteristics between the elements, and will be referred to below as the "inter-element calibration". Note that the test pattern image 51 includes images formed with constant densities across the width of the paper 5 by the recording portion 205 and arranged in descending order of density (51a', 51b', . . . , 51n'), as shown in FIG. 7. In the present embodiment, the test pattern image 51 in FIG. 7 is subjected to color measurement at predetermined positions by the colorimeter 40, so that density data that provides absolute color information is obtained as colorimetric data, based on which the aforementioned shading correction is performed. As a result of shading correction, the amount of ink ejection from each printhead is adjusted to an absolute density. Further, based on the test pattern imaging data and the colorimetric data obtained as above, imaging calibration data for imaging calibration of the inline scanner 30 is generated as well.

FIG. 8 is a schematic diagram showing a fourth example of the test pattern image to be read for imaging calibration of the inline scanner 30, along with the inline scanner 30 and the colorimeter 40. In the case where shading correction is performed up to the halftone color in real time during a printing operation using the test pattern image 51 in the third example (FIG. 7), paper waste occurs because such shading correction requires a halftone test pattern image to be formed as a printed image. In contrast, in the case where the test pattern image 51 for shading correction only includes solid images (100% density images), the test pattern image 51 is placed outside the target printed image 50, i.e. outside the boundaries of a page, as shown in FIG. 8, thereby allowing real-time shading correction. However, when shading correction is performed without using a halftone test pattern image 51, imaging calibration cannot be carried out with sufficiently high accuracy. Therefore, in this example, the target printed image 50 includes representative color patches 52 of the same colors as both halftone colors and specific colors, and the representative color patches 52 are placed in an unused area outside the target printed image 50, as shown in FIG. 8. The representative color patches 52 are used as calibration patches for the inline scanner 30 and the colorimeter 40 to perform imaging and color measurement and thereby obtain test pattern imaging data and colorimetric data, based on which imaging calibration data for imaging calibration of the inline scanner 30 is generated.

1.5 Operation of the Printing Apparatus

In the present embodiment, the CPU 111 of the control portion 100 executes the control program 17 after reading the control program 17 from the auxiliary storage device 12 into the memory 112 (see FIG. 2), whereby the recording portion 205, the transport mechanism, etc., of the printing mechanism 200 are controlled to perform printing on the paper 5, and the inline scanner 30 and the colorimeter 40 are also controlled to perform imaging and color measurement on a printed image formed on the paper 5 and thereby obtain imaging data for the printed image. Based on the imaging data, the quality of the printed image is determined. Specifically, in the printing apparatus 10 according to the present embodiment, the CPU 111 executes the printing control process 18a and the inspection control process 18b in accordance with the control program 17, thereby realizing the printing apparatus's original function of forming a printed image on the paper 5 and an additional printed image inspection function for inspecting the printed image using the inline scanner 30, etc., in the printing mechanism 200. That is, the printing apparatus 10 according to the present embodiment includes a printed image inspection device realized by the inline scanner 30 serving as the imaging portion, the colorimeter 40, the moving mechanism 45 for the colorimeter 40 (see FIG. 3), the recording portion 205, the transport mechanism, and the control portion 100 executing the inspection control process 18b.

Figure 9:
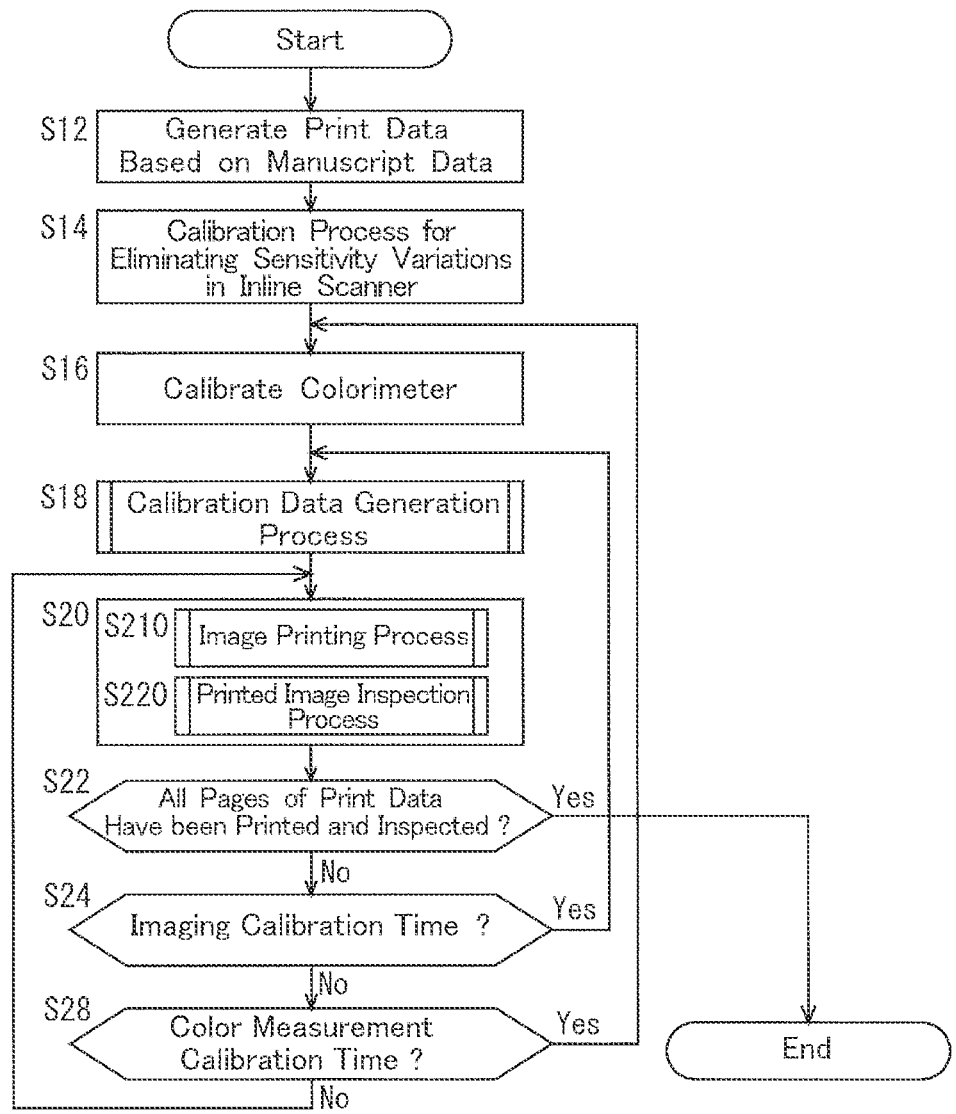
FIG. 9 is a flowchart showing a control process of the printing apparatus in the first embodiment.

FIG. 9 is a flowchart showing a control process of the printing apparatus 10 in the present embodiment, including the printing control process 18a and the inspection control process 18b, which are realized by the CPU 111 executing the control program 17 (the control process of the printing apparatus 10 will be simply referred to below as the "control process"). In order for the printing apparatus 10 according to the present embodiment to print an input image represented by print data generated from manuscript data, the control portion 100 controls the printing mechanism 200, the paper feeding portion 202, and the paper winding portion 208 (see FIGS. 1 and 2) in accordance with the procedure shown in FIG. 9. For this purpose, the CPU 111 executes the control program 17 after reading the control program 17 from the auxiliary storage device 12 into the memory 112. This activates the control process shown in FIG. 9 and thereby causes the CPU 111 to operate as described below in accordance with the control program 17. Note that as can be appreciated from the description below, the inspection control process 18b is realized by steps S14 to S18, S220, and S22 to S28 of the control process in FIG. 9.

First, the image processing portion 117 is controlled to rasterize manuscript data provided externally via the network 3 and thereby generate print data in bitmap format (step S12). The print data contains data for a target image, which is an input image represented by the manuscript data.

Next, before the printing of the target image based on the generated print data is started, a process for imaging calibration of the inline scanner 30 is performed (step S14). Specifically, this process initially eliminates variations in imaging sensitivity among the imaging elements 31 of the inline scanner 30 for example, by setting sensitivity variation correction factors by which to multiply output values of the imaging elements in the inline scanner 30.

Figure 10:
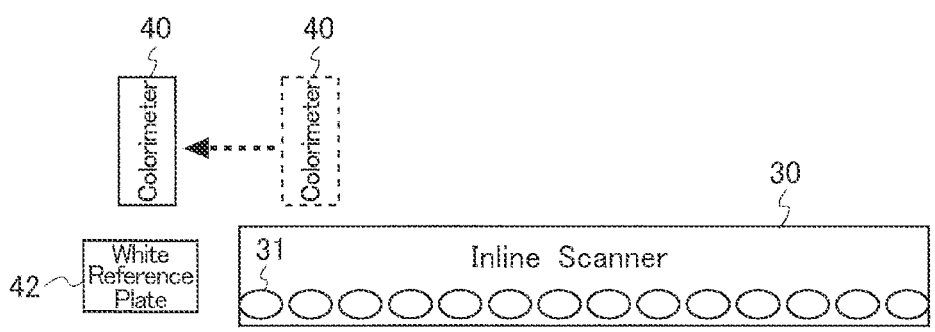
FIG. 10 is a diagram for describing calibration of the colorimeter in the first embodiment.

Thereafter, the colorimeter 40 is calibrated for color measurement (step S16). FIG. 10 is a diagram for describing the calibration of the colorimeter 40. In the present embodiment, the printing mechanism 200 is equipped with a white reference plate 42 for use in calibrating the colorimeter 40. The white reference plate 42 is disposed so as to face the color detection surface of the colorimeter 40 when the colorimeter 40 is located at a predetermined position outside a range where the colorimeter 40 can be positioned for performing color measurement on a printed image on the paper 5, but within a range where the colorimeter 40 can move in the width direction (for example, the predetermined position is an end position of the movable range). In step S16, the colorimeter 40 is calibrated by moving the colorimeter 40 to the predetermined position using the moving mechanism 45 and causing the colorimeter 40 to perform color measurement on the white reference plate 42.

Figure 11:
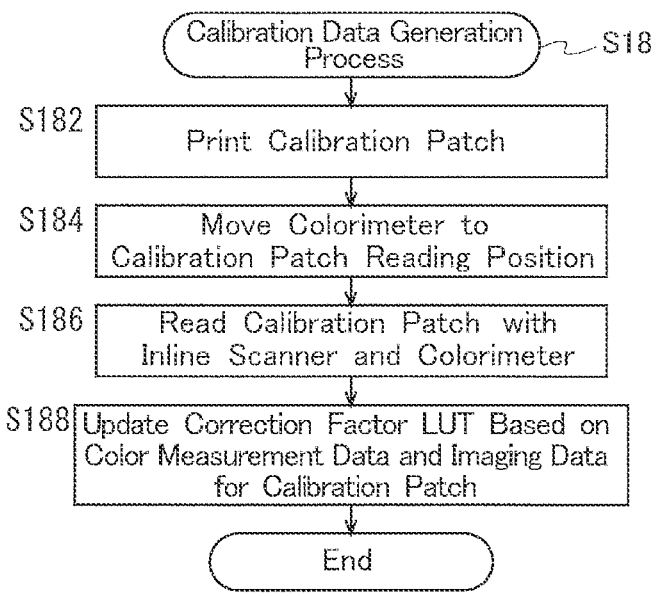
FIG. 11 is a flowchart showing a calibration data generation process in the first embodiment.

Performed next is a process for generating imaging calibration data (also simply referred to below as "calibration data") for imaging calibration of the inline scanner 30 serving as the imaging portion (step S18). FIG. 11 is a flowchart showing the calibration data generation process in the present embodiment. In the calibration data generation process, the CPU 111 operates as described below.

First, the recording portion 205 and the transport mechanism are controlled such that the recording portion 205 forms calibration patches on the paper 5 as printed images (step S182). Note that the calibration patch can be printed as: a part or whole of a test pattern image formed separately from a target printed image, as in the first and third examples (FIGS. 5 and 7); an image simultaneously formed with a target printed image outside the target printed image, as in the fourth example (FIG. 8); or a calibration patch (including a test pattern) constituting a part (partial image) of a target printed image, as in the second example (FIG. 6). The calibration patch formed as the printed image in step S182 is any of the printed images as appearing in the first and third examples (FIGS. 5 and 7). Printed images of calibration patches as shown in the second and fourth examples (FIGS. 6 and 8) can be formed by an image printing process (step S210) in the second embodiment to be described later (see FIGS. 22 and 23).

Next, the moving mechanism 45 moves the colorimeter 40 to a calibration patch reading position (step S184), i.e., the colorimeter 40 is moved to a position at which to perform color measurement on a printed image of a calibration patch, as shown in, for example, FIG. 6.

Thereafter, the printed image of the calibration patch is read by the inline scanner 30 and the colorimeter 40 (step S186). Specifically, the inline scanner 30 captures the printed image of the calibration patch and thereby generates calibration patch imaging data. Here, the calibration patch imaging data is imaging data for a part or whole of the printed image of the test pattern, and therefore will also be referred to below as the "test pattern imaging data". Further, the colorimeter 40 performs color measurement on the printed image of the calibration patch and thereby generates colorimetric data. Note that the imaging elements 31 included in the inline scanner 30 are arranged in the paper width direction, and one of the imaging elements 31 that is located at a position corresponding to the position of the calibration patch in the paper width direction (this imaging element 31 being shaded with oblique lines in FIGS. 5 to 7) is used to capture the printed image of the calibration patch.

Once the imaging data for the calibration patch (calibration imaging data) and the colorimetric data are obtained as above, imaging calibration data is generated based on these data (step S188). The imaging calibration data provides correction factors by which to multiply output values of the respectively corresponding imaging elements 31 included in the inline scanner 30, and each correction factor is determined such that the value obtained by multiplying the output value of the corresponding imaging element by the correction factor corresponds to a colorimetric value obtained by the colorimeter 40 measuring the calibration patch. In the present embodiment, such correction factors are contained in a lookup table prepared in advance. Specifically, in a printed image inspection process to be described later (FIG. 13), a correction factor for imaging data of a target printed image is prepared for each imaging element 31 of the inline scanner 30 as calibration data for imaging calibration of the inline scanner 30. For example, when the inline scanner 30 includes n imaging elements 31, which are distinguished by reference characters "31-k" (where k=1 to n), a lookup table (referred to below as a "correction factor LUT") 19 is prepared in advance for mapping the correction factors Ck of the imaging elements 31-$k$ to integers k such that 1≤k≤n (see FIG. 2). In step S188, once new correction factors C1 to Cn are generated as imaging calibration data, the correction factor LUT 19 is updated with the new correction factors C1 to Cn. In the following, it is assumed that the inline scanner 30 serving as the imaging portion includes n imaging elements 31-1 to 31-$n$ and that the imaging calibration data provides correction factors C1 to Cn.

Once the correction factor LUT 19 for imaging calibration is updated as above, the calibration data generation process ends, and control advances to step S20. In step S20, an image printing process (step S210) and a printed image inspection process (step S220) are executed concurrently. Note that in the example shown in FIG. 9, steps S210 and S220 are executed on a page by page basis, and when steps S210 and S220 are executed for a page, whether the page is the last page of the print data is determined in step S22 to be described later. Further, in the present embodiment, while the image printing process (S210) and the printed image inspection process (S220) are being sequentially executed on a page by page basis up to the last page of the print data, there is at least one time at which imaging calibration is performed on the inline scanner 30 (referred to below as the "imaging calibration time"; see step S24 to be described below), and also at least one time at which color measurement calibration is performed on the colorimeter 40 (referred to below as the "color measurement calibration time"; see step S28 to be described below). These times are specified in advance, for example, by elapsed time since the start of printing or the number of pages printed.

Figure 12:
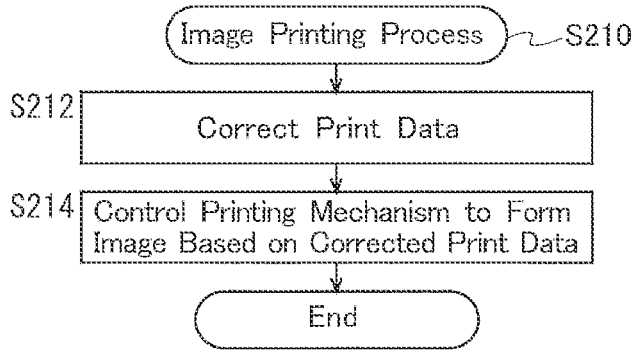
FIG. 12 is a flowchart showing an image printing process in the first embodiment.

FIG. 12 is a flowchart showing the image printing process in the present embodiment. In the image printing process, the CPU 111 operates as described below.

First, the print data generated in step S12 is corrected (step S212). The correction is intended to ensure that images represented by the print data are recorded well on the paper 5 (i.e., printed images are formed well on the paper 5), and here, shading correction is performed to prevent the printed images from having uneven densities due to variations in the amounts of ink ejected from the printheads. However, other corrections may also be included.

Next, based on the corrected print data, the printing mechanism 200 and other components are controlled to form the images represented by the print data, i.e., target images, on the paper 5 as target printed images (step S214). Specifically, in order to record the images represented by the print data onto the paper 5, the paper feeding portion 202, the drive rollers 203 and 207, the drying portion 206, the inline scanner 30, the colorimeter 40, and the paper winding portion 208 (see FIG. 1) are controlled along with the recording portion 205. As a result, the recording portion 205 sequentially records the target images onto the paper 5 being transported while being unwound from the paper feeding portion 202. That is, the target printed images are sequentially formed on the paper 5. The paper 5 with the target printed images sequentially formed as above is dried by the drying portion 206, and then the target printed images are subjected to imaging by the inline scanner 30 before the paper 5 is wound up onto the paper winding portion 208. Note that the imaging by the inline scanner 30 and a process based on imaging data resulting from the imaging are described below in conjunction with the printed image inspection process.

Figure 13:
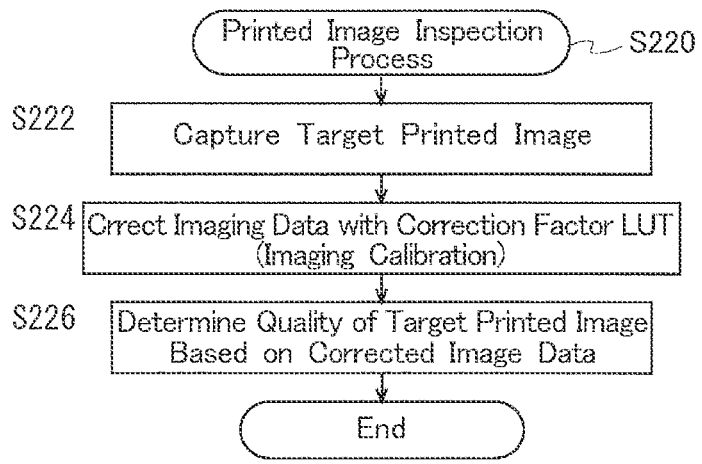
FIG. 13 is a flowchart showing a printed image inspection process in the first embodiment.

The printed image inspection process is executed concurrently with the image printing process. FIG. 13 is a flowchart showing the printed image inspection process in the present embodiment. In the printed image inspection process, the CPU 111 operates as described below.

First, during the printing operation in which the target printed images are sequentially formed on the paper 5 by the image printing process, the target printed images formed on the paper 5 are sequentially captured by the inline scanner 30 (step S222). However, in the example shown in FIG. 9, step S220 is executed on a page by page basis, as described earlier, and therefore when imaging data is generated by capturing target printed images for one page, control advances next to step S224.

In step S224, the imaging data for one page generated in step S222 is corrected using the correction factor LUT 19 updated in step S18. The correction here corresponds to imaging calibration of the inline scanner 30.

Thereafter, the imaging data thus corrected (referred to below as the "corrected imaging data") is compared with, for example, the print data as originally provided, whereby the quality of the target printed images captured in step S222 is determined (step S226). The determination results are, for example, stored to and/or displayed in the control portion 100, but the details of such operations are not directly relevant to the present invention and therefore will not be elaborated upon.

Once the quality of the printed images for one page is determined as described above, the printed image inspection process in step S220 ends, and control proceeds to step S22.

In step S22, it is determined whether all pages of the print data have been printed and inspected through the formation and inspection of the target printed images in steps S210 and S220. If the determination result indicates that the print data has a page that has not yet been printed and inspected, control proceeds to step S24 to determine whether the time for imaging calibration of the inline scanner 30 (imaging calibration time) has arrived.

If the determination result in step S24 indicates that the imaging calibration time has not yet arrived, control proceeds to step S28 to determine whether the time for color measurement calibration of the colorimeter 40 (color measurement calibration time) has arrived. If the determination result indicates that the color measurement calibration time has not yet arrived, control returns to step S20, and steps from S20 onward are executed as described above.

Thereafter, if it is determined in step S24 that the imaging calibration time has not yet arrived and also if it is determined in step S28 that the color measurement calibration time has not yet arrived, the following steps are repeatedly executed in the order: S20 (S210 and S220) →S22→S24→S28, until all pages of the print data are printed and inspected. During the execution of steps S20 to S28, if it is determined in step S24 that the imaging calibration time has arrived, control returns to step S18 to perform the calibration data generation process and thereby update the correction factor LUT 19 (see FIG. 11), and thereafter steps from S20 onward are executed.

During the execution of steps S20 to S28, if it is determined in step S28 that the color measurement calibration time has arrived, control returns to step S16 to calibrate the colorimeter 40, and steps from S20 onward are executed after the correction factor LUT 19 is updated by the calibration data generation process (FIG. 11).

During the execution of steps S20 through S28, if it is determined in step S22 that all pages of the print data have been printed and inspected, the control process of the printing apparatus 10 (i.e., the print operation) ends for the print data generated from a single set of manuscript data.

1.6 Update of the Correction Factor LUT and Correction of the Imaging Data

As described above, in this embodiment, the correction factor LUT 19 for imaging calibration is prepared in advance, and when the imaging calibration time arrives during the printing operation, the correction factor LUT 19 is updated (see step S24→step S18 in FIG. 9) with the imaging calibration data generated in the calibration data generation process (step S18). Further, in the printed image inspection process (step S220), the imaging data of the printed images is corrected using the correction factor LUT 19, thereby achieving imaging calibration (step S224 in FIG. 13). The update of the correction factor LUT 19 and the correction of the imaging data with the correction factor LUT 19 will be described below with a focus on the generation of related data.

Figure 14:
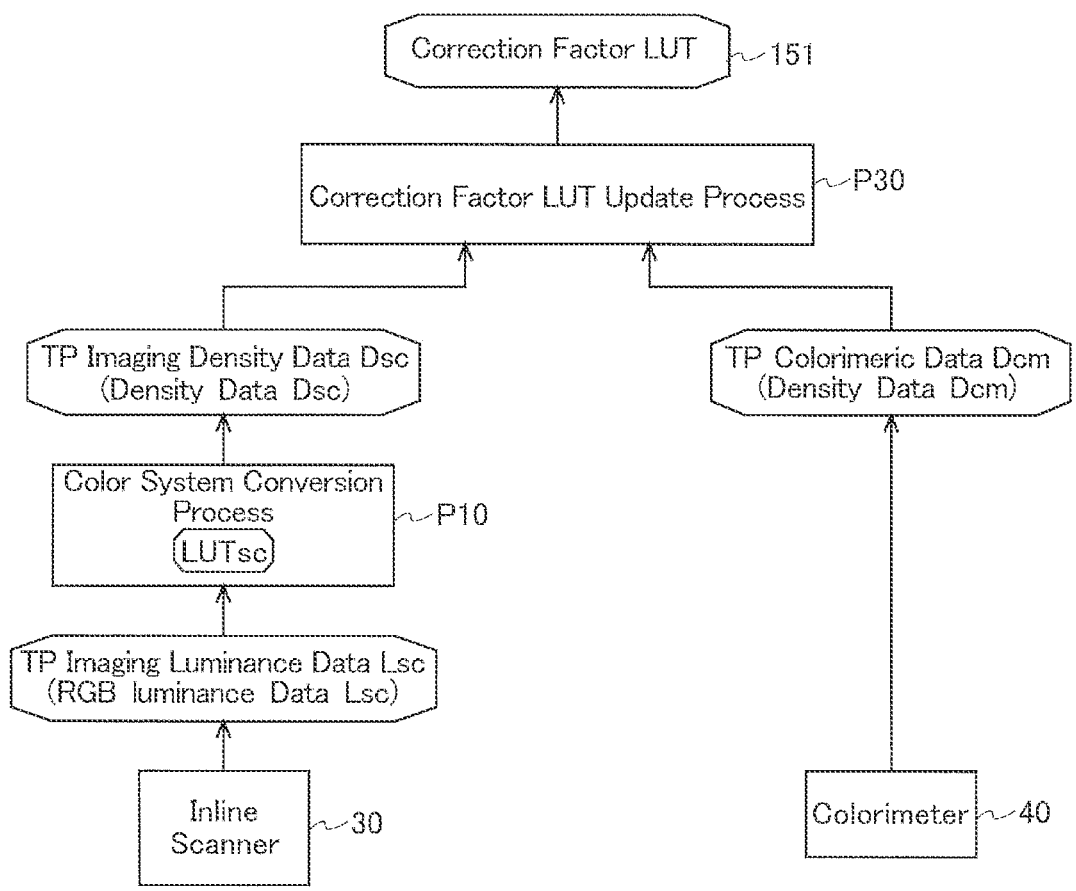
FIG. 14 is a flow diagram showing a first example of the procedure for updating a correction factor LUT in the first embodiment.

FIG. 14 is a flow diagram showing a first example of the procedure for updating the correction factor LUT in the present embodiment. In FIG. 14, rectangles represent hardware or software that performs predetermined processes (processing routines included in the control program 17), and octagons represent data (including a lookup table). Such a schematic representation is also used in FIGS. 16 through 21 to be described later.

In the calibration data generation process (S18) in the present embodiment, the inline scanner 30 captures a printed image of a test pattern including a calibration patch formed on the paper 5 and thereby generates test pattern (TP) imaging luminance data Lsc as calibration imaging data (steps S182 to S186 in FIG. 11), as shown in FIG. 14. Note that the term "test pattern" will also be abbreviated below as "TP". Also, the printed image of the calibration patch is subjected to color measurement by the colorimeter 40, thereby generating TP colorimetric data Dcm as calibration colorimetric data (step S186 in FIG. 11). The TP imaging luminance data Lsc and the TP colorimetric data Dcm are RGB luminance data and CMY density data, respectively, and therefore in order to generate imaging calibration data from the data Lsc and Dcm, it is necessary to match the data Lsc and Dcm in terms of color system. Accordingly, in this example, the TP imaging luminance data Lsc is converted to density data by performing a color system conversion process P10. The color system conversion process P10 is performed using a lookup table (LUTsc) prepared in advance. This results in TP imaging density data Dsc.

Next, a process P30 is performed to update a correction factor LUT 151 for imaging calibration (step S188 in FIG. 11). Note that to distinguish the correction factor LUT 19 to be updated in the present example from correction factor LUTs to be updated in other examples, reference numeral "151" is used in place of reference numeral "19". In the updating process P30, the difference between the TP imaging density data Dsc and the TP colorimetric data Dcm obtained as above is determined, and the correction factors C1 to Cn mentioned earlier are determined so as to eliminate or at least reduce the difference. For example, when the test pattern image is a printed image including calibration patches recorded with constant densities in the paper width direction (see FIG. 7), a correction factor Ck (where k=1 to n) is obtained for each of the imaging elements 31-1 to 31-n such that multiplying the value of the TP imaging density data Dsc that corresponds to the output value of the imaging element 31-k by the correction factor Ck results in a value equal to the value of the colorimetric data Dcm of the calibration patch. The correction factors C1 through Cn thus obtained anew are used to update the correction factor LUT 151.

Figure 15:
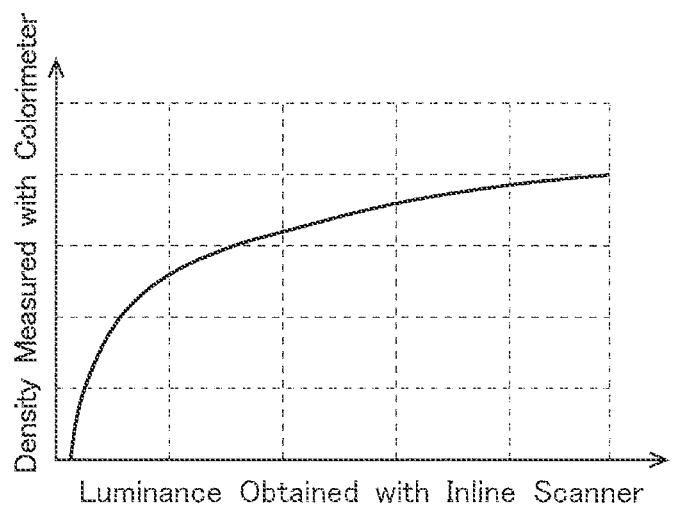
FIG. 15 is a graph for describing a second example of the procedure for updating the correction factor LUT in the first embodiment.

FIG. 15 is a graph for describing a second example of the procedure for updating the correction factor LUT 19. Note that to distinguish the correction factor LUT 19 to be updated in the present example from correction factors LUT to be updated in other examples, reference numeral "152" is used in place of reference numeral "19". In this example, color measurement values corresponding to luminance values obtained by the inline scanner 30 are obtained in advance for each of the RGB channels by the inline scanner 30 and the colorimeter 40 performing imaging and color measurement on primary-color patches with various densities. This results in creating in advance tables for the respective colors cyan, magenta, and yellow (C, M, and Y), which represent the relationships between luminance values obtained by the inline scanner 30 for corresponding complementary red, green, and blue (RGB) color channels and density values obtained by the colorimeter 40, as shown in FIG. 15. Thereafter, a correction factor LUT 152 is created according to the degree of deviation of the correspondence between calibration imaging data values and colorimetric data values from the relationship between the luminance values and the density values as shown in FIG. 15. Here, the calibration imaging data values are luminance values obtained by the inline scanner 30 capturing images of calibration patches, and the colorimetric data values are density values obtained by the colorimeter 40 performing color measurement on the images of the calibration patches. Moreover, after the correction factor LUT 152 is created, the correction factor LUT 152 is updated during the printing operation by the inline scanner 30 and the colorimeter 40 performing imaging and color measurement on the calibration patches.

Figure 16:
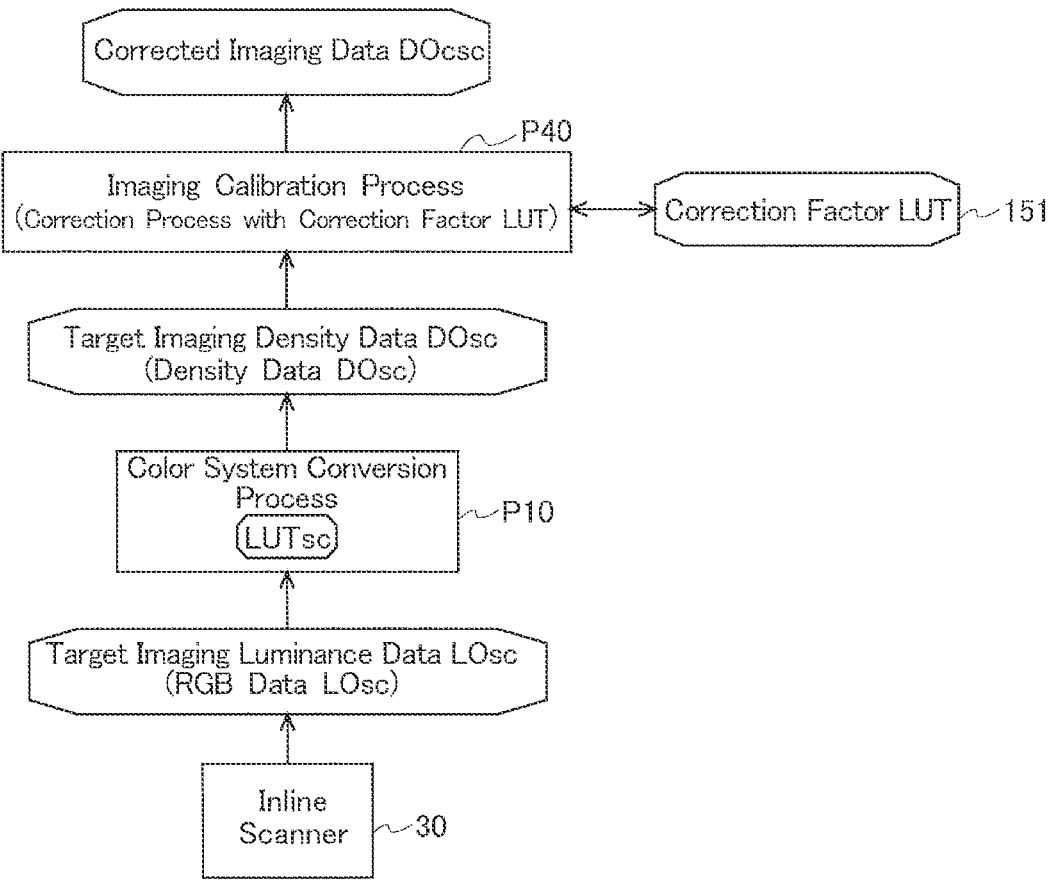
FIG. 16 is a flow diagram showing a first example of the procedure for correcting imaging data for imaging calibration in the first embodiment.

FIG. 16 is a flow diagram showing a first example of the procedure for correcting the imaging data for imaging calibration in the present embodiment. When the printing mechanism 200 forms a target printed image on the paper 5 based on print data, the target printed image is captured by the inline scanner 30, thereby generating target imaging luminance data LOsc as target imaging data (step S222 in FIG. 13). The target imaging luminance data LOsc is converted to target imaging density data DOsc by the color system conversion process P10. Thereafter, the target imaging density data DOsc is subjected to an imaging calibration process P40. In the imaging calibration process P40, the target imaging density data DOsc is corrected using the correction factor LUT 151, which is updated as shown in FIG. 14, resulting in corrected imaging data DOcsc (step S224 in FIG. 13). The correction here corresponds to imaging calibration.

Figure 17:
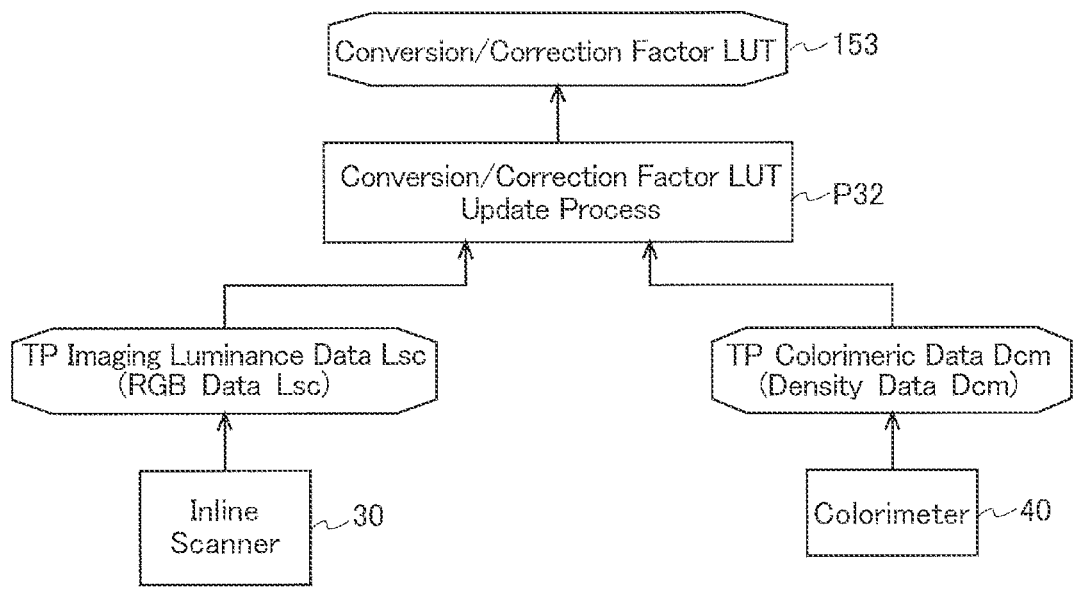
FIG. 17 is a flow diagram showing a third example of the procedure for updating the correction factor LUT (conversion/correction factor LUT) in the first embodiment.

FIG. 17 is a flow diagram showing a third example of the procedure for updating the correction factor LUT 19. In this example, the correction factor LUT is integrated with the lookup table (LUTsc) for the color system conversion process P10 in the first example shown in FIG. 14, resulting in a single lookup table (referred to below as a "conversion/correction factor LUT") 153. To (create and) update the conversion/correction factor LUT 153, a process P32 for updating the conversion/correction factor LUT 153 is performed based on TP imaging luminance data Lsc generated by the inline scanner 30 and TP colorimetric data Dcm obtained by the colorimeter 40, as shown in FIG. 17. In the process P32 for updating the conversion/correction factor LUT 153, the conversion/correction factor LUT 153 is (created and) updated as a lookup table for making some correction for imaging calibration without converting RGB luminance data, which is generated as imaging data by the inline scanner 30, to density data.

Figure 18:
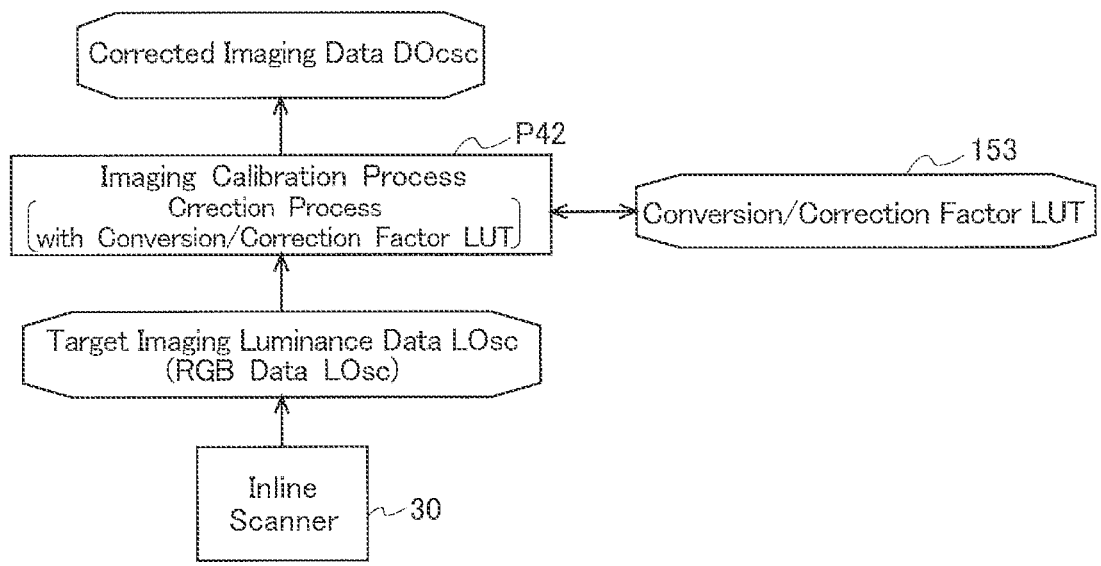
FIG. 18 is a flow diagram showing a second example of the procedure for correcting the imaging data for imaging calibration in the first embodiment.

FIG. 18 is a flow diagram showing a second example of the procedure for correcting the imaging data for imaging calibration in the present embodiment. In this example, the conversion/correction factor LUT 153 is used to generate corrected imaging data DOcsc. Specifically, once the inline scanner 30 captures a target printed image and thereby generates target imaging luminance data LOsc as target imaging data (step S222 in FIG. 13), the target imaging luminance data LOsc is subjected to an image calibration process P42 using the conversion/correction factor LUT 153, so that the target imaging luminance data LOsc is converted to density data and corrected for image calibration at the same time. As a result, corrected imaging data DOcsc is generated (see step S224 in FIG. 13).

Figure 19:
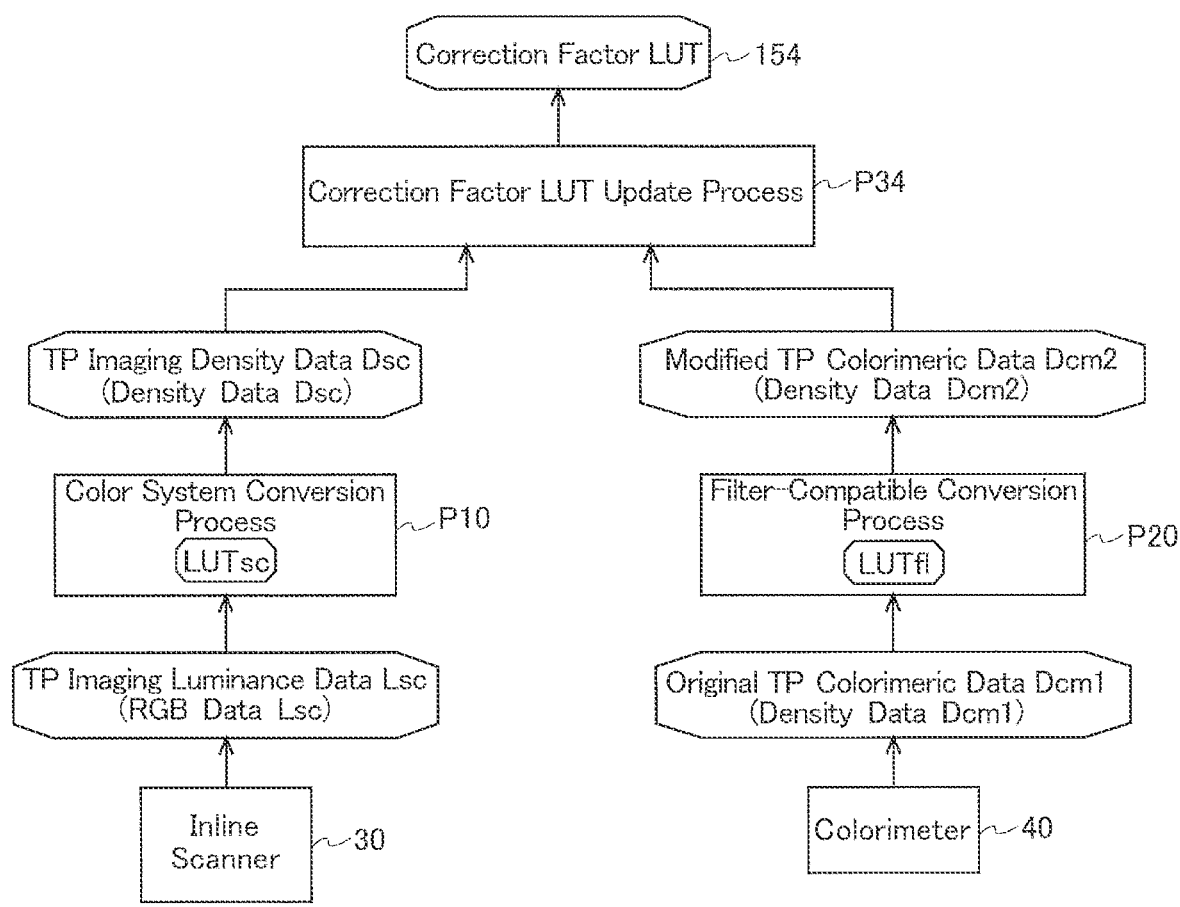
FIG. 19 is a flow diagram showing a fourth example of the procedure for updating the correction factor LUT in the first embodiment.

FIG. 19 is a flow diagram showing a fourth example of the procedure for updating the correction factor LUT 19. Note that to distinguish the correction factor LUT 19 to be updated in this example from correction factor LUTs to be updated in other examples, reference numeral "154" is used in place of reference numeral "19". In this example, the colorimeter 40 contains a lookup table (LUTfl) that takes account of the characteristics of the color filters used in the inline scanner 30. Specifically, in this example, as shown in FIG. 19, the colorimeter 40 generates original TP colorimetric data Dcm1 as colorimetric data for calibration, and the original TP colorimetric data Dcm1 is converted to modified TP colorimetric data Dcm2 by a filter-compatible conversion process P20. The filter-compatible conversion process P20 is a process for modifying colorimetric data while taking account of the characteristics of the color filters in the inline scanner 30, and thereby allowing appropriate imaging calibration over a wider color reproduction range. The filter-compatible conversion process P20 uses a lookup table (LUTfl) adapted therefor. On the other hand, the TP imaging luminance data Lsc generated by the inline scanner 30 is converted to TP imaging density data Dsc by the color system conversion process P10, as in the first example of the procedure for updating the correction factor LUT (FIG. 14). Based on the TP imaging density data Dsc and the modified TP colorimetric data Dcm2 obtained as above, the correction factor LUT 154 is updated with correction factors C1 to Cn obtained in the same manner as in the first example, by a process P34 for updating the correction factor LUT.

Figure 20:
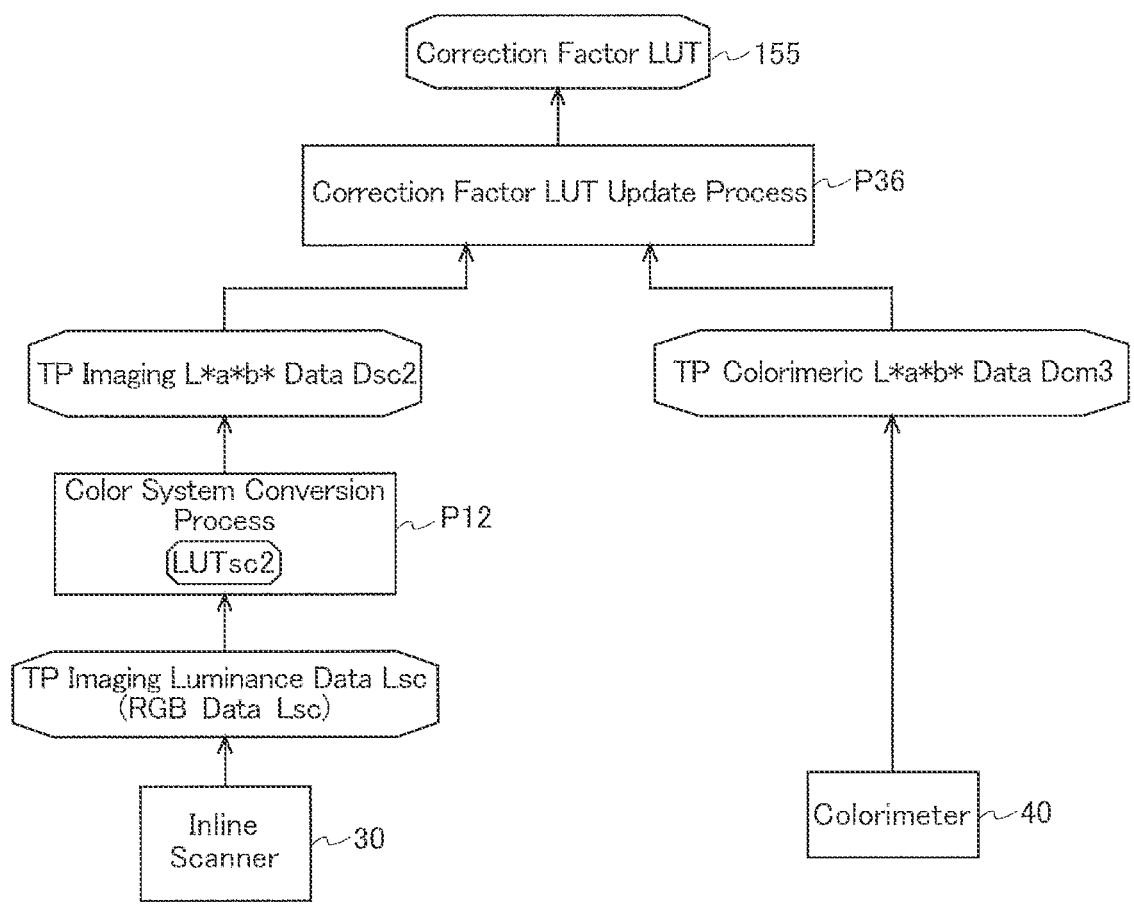
FIG. 20 is a flow diagram showing a fifth example of the procedure for updating the correction factor LUT in the first embodiment.

FIG. 20 is a flow diagram showing a fifth example of the procedure for updating the correction factor LUT 19. Note that to distinguish the correction factor LUT 19 to be updated in this example from correction factor LUTs to be updated in other examples, reference numeral "155" is used in place of reference numeral "19". The correction factors contained in the correction factor LUTs 151 through 154 described above are those for imaging data expressed in densities, but the correction factors may be those for imaging data in other color systems. The correction factor LUT 155 used in this example contains correction factors for imaging data in the CIE 1976 $L^*a^*b^*$ color system. By using such a correction factor LUT 155, imaging calibration can be performed even when secondary- or tertiary-color patches are used as calibration patches. The procedure for updating the correction factor LUT 155 in the present example will be described below.

In the present example, the inline scanner 30 captures a printed image of a calibration patch or a test pattern including the calibration patch and thereby generates TP imaging luminance data Lsc, and the TP imaging luminance data Lsc is converted to TP imaging $L^*a^*b^*$ data Dsc2, which is imaging data in the CIE 1976 $L^*a^*b^*$ color system, by a color system conversion process P12 using a lookup table LUTsc2 (steps S182 to S186 in FIG. 11). The printed image of the calibration patch is also subjected to color measurement by the colorimeter 40, so that TP colorimetric $L^*a^*b^*$ data Dcm3, which is colorimetric data in the CIE 1976 $L^*a^*b^*$ color system, is generated as colorimetric data for calibration (step S186 in FIG. 11). Thereafter, a process P36 is performed to update the correction factor LUT 155 for imaging calibration (step S188 in FIG. 11).

Figure 21:
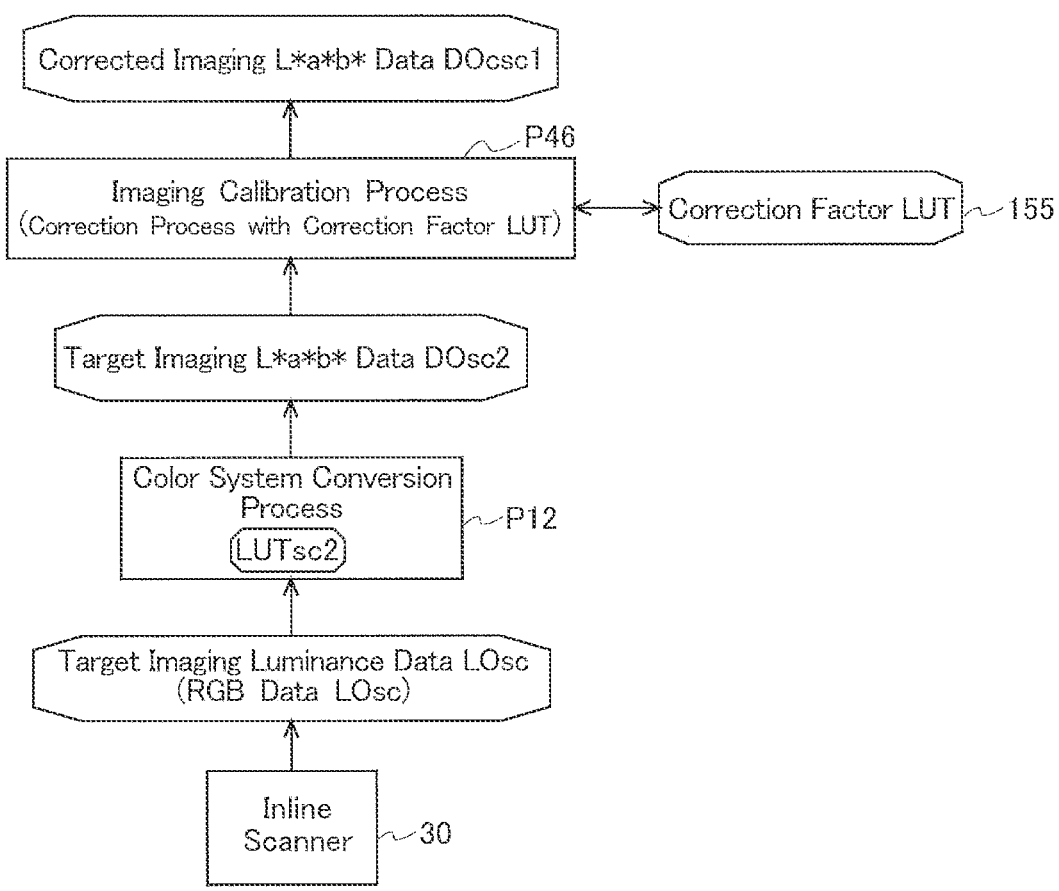
FIG. 21 is a flow diagram showing a third example of the procedure for correcting the imaging data for imaging calibration in the first embodiment.

FIG. 21 is a flow diagram showing a third example of the procedure for correcting the imaging data for imaging calibration in the present embodiment. When the printing mechanism 200 forms a target printed image on the paper 5 based on print data, the target printed image is captured by the inline scanner 30, thereby generating target imaging luminance data LOsc as target imaging data (step S222 in FIG. 13). The target imaging luminance data LOsc is converted to target imaging $L^*a^*b^*$ data DOsc2 by the color system conversion process P12 using the lookup table LUTsc2.

Thereafter, the target imaging $L^*a^*b^*$ data DOsc2 is subjected to an imaging calibration process P46. In the imaging calibration process P46, the target imaging $L^*a^*b^*$ data DOsc2 is corrected with the correction factor LUT 155, which is updated as shown in FIG. 20, resulting in corrected imaging $L^*a^*b^*$ data DOcsc1 (step S224 in FIG. 13). The correction here corresponds to imaging calibration. In the printed image inspection process (FIG. 13), the quality of the target printed image is determined based on the corrected imaging $L^*a^*b^*$ data DOcsc1 (step S226 in FIG. 13).

1.7 Effects

As described above, in the present embodiment, the inline scanner 30 serving as the imaging portion is subjected to imaging calibration using a blank area of the paper before a printing operation, and the inline scanner 30 is also subjected to imaging calibration during the printing operation (step S24→step S18 in FIG. 9). Specifically, during the printing operation, at least a part of a printed image formed on the paper 5 is used as an image of a calibration patch, and the calibration patch is subjected to imaging and color measurement by the inline scanner 30 and the colorimeter 40 (see FIGS. 5, 7, and 9). As a result, calibration imaging data and calibration colorimetric data are obtained, and based on the calibration imaging data and the calibration colorimetric data, imaging calibration data is generated and used to update the correction factor LUT (see FIGS. 11, 14, 17, 19, and 20). In the printed image inspection process (FIG. 13) in the present embodiment, the imaging data obtained by the inline scanner 30 capturing the target printed image formed on the paper 5 is subjected to a correction using the correction factor LUT, thereby achieving imaging calibration (see step S224 in FIG. 13, and FIGS. 16, 18, and 21). Based on the imaging data subjected to the correction (i.e., the corrected imaging data), the quality of the target printed image is determined (see step S226 in FIG. 13).

In the present embodiment as described above, imaging calibration is performed even during the printing operation by using the colorimetric data for the calibration patch, and therefore, even if the imaging sensitivity of the inline scanner 30 varies due to environmental changes, such as temperature changes, during the printing operation, imaging calibration can be accurately performed in real time in response to such variations. Accordingly, when the density of the printed image formed on the paper 5 varies during the printing operation, such density variations can be properly detected by the printed image inspection process based on the imaging data obtained by the inline scanner 30 (see step S220 in FIG. 9, and FIG. 13). In other words, it is possible to properly monitor the density of the printed image during the printing operation while eliminating the influence of changes in the characteristics of the printed image inspection device due to environmental changes, such as temperature changes. Note that in the present embodiment, highly accurate imaging calibration data can be obtained by performing imaging and color measurement on calibration patches that include halftone colors and secondary colors, and therefore, correcting an inspection target image using a correction factor LUT based on the obtained imaging calibration data allows accurate imaging calibration.

Furthermore, in the present embodiment, as described earlier, the inline scanner 30 and the colorimeter 40, which obtain the calibration imaging data and the calibration colorimetric data required for imaging calibration as described above, are positioned so as to face the imaging support roller 204a and the color measurement support roller 204b, respectively, as shown in FIG. 4. This prevents the imaging and color measurement positions from being displaced due to fluttering and/or cockling of the paper being transported, so that imaging and color measurement can be performed stably and well on printed images formed on the paper 5. Therefore, in the present embodiment, the arrangement of the inline scanner 30 and the colorimeter 40 as shown in FIG. 4 also contributes to accurate imaging calibration.

2. SECOND EMBODIMENT

Next, a printing apparatus 10 according to a second embodiment of the present invention will be described. In the present embodiment, the test pattern images that are used for imaging calibration of the inline scanner 30 serving as the imaging portion are those shown in FIGS. 6 and 8, i.e., the test pattern images are included in or arranged outside target printed images that are formed on the paper 5 based on print data. Note that in the following, components of the printing apparatus 10 according to the present embodiment that are the same as or correspond to those in the first embodiment are denoted by the same reference numerals and will not be elaborated upon.

Figure 22:
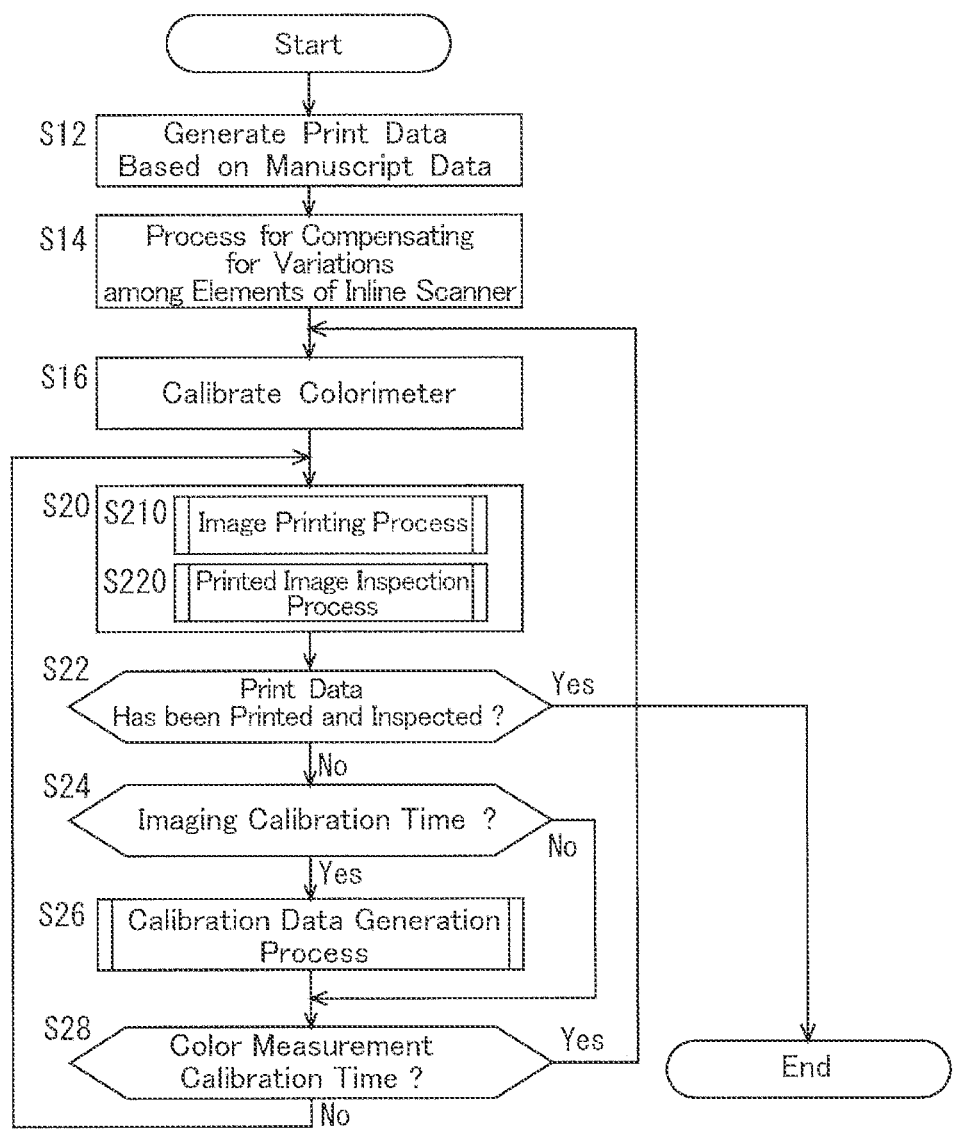
FIG. 22 is a flowchart showing a control process, including an inspection control process, of a printing apparatus in a second embodiment of the present invention.

FIG. 22 is a flowchart showing a control process of the printing apparatus 10 in the present embodiment, including the printing control process 18a and the inspection control process 18b, which are realized by the CPU 111 executing the control program 17 (the control process of the printing apparatus 10 will be simply referred to below as the "control process"). In order for the printing apparatus 10 according to the present embodiment to print an input image represented by print data generated from manuscript data, the control portion 100 controls the printing mechanism 200, the paper feeding portion 202, and the paper winding portion 208 (see FIGS. 1 and 2) in accordance with the procedure shown in FIG. 22. For this purpose, the CPU 111 executes the control program 17 after reading the control program 17 from the auxiliary storage device 12 into the memory 112. This activates the control process shown in FIG. 22 and thereby causes the CPU 111 to operate as shown in FIG. 22 in accordance with the control program 17.

As can be appreciated by comparing FIG. 22 with FIG. 9, in the first embodiment, the calibration data generation process (S18) is performed before the execution of the image printing process (S210), whereas in the second embodiment, the calibration data generation process (S26) is performed after the execution of the image printing process (S210). The reason for this is that the test pattern images that are used in the present embodiment are those as shown in FIGS. 6 and 8, and the test pattern images, along with calibration patches, are formed simultaneously with target printed images on the paper 5 based on the print data, as parts of the target printed images or as printed images outside the target printed images.

Figure 23:
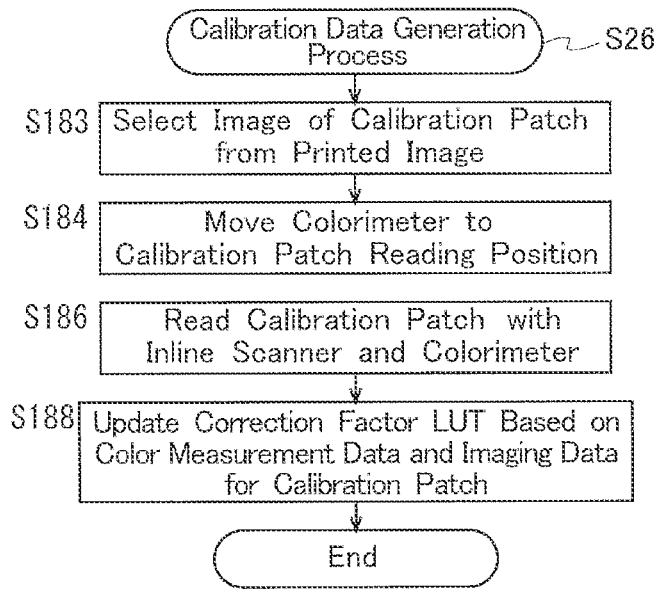
FIG. 23 is a flowchart showing a calibration data generation process in the second embodiment.

FIG. 23 is a flowchart showing the calibration data generation process (S26) in the present embodiment. In the calibration data generation process (S26), the CPU 111 operates as described below.

In the present embodiment, the test pattern image, along with the calibration patches, is formed on the paper 5 simultaneously with the target printed image as described above (see FIGS. 6 and 8), and therefore in the calibration data generation process (S26), an image of a calibration patch is initially selected from printed images including the target printed image, formed on the paper 5 (step S183). However, in the case of the test pattern image as shown in FIG. 8, the test pattern image, along with the calibration patches, is specified in advance, and therefore control advances next to step S184 without any substantial processing being performed in step S183. The processing from step S184 onward in the calibration data generation process (S26) is the same as in the calibration data generation process (S18 in FIG. 11) in the first embodiment and therefore will not be elaborated upon.

In the present embodiment, if it is determined in step S24 in FIG. 22 that the imaging calibration time has arrived before all pages of the print data are printed and inspected, the calibration data generation process (S26) is executed so that the correction factor LUT is updated. If it is determined in step S24 that the imaging calibration time has not yet arrived, control advances to step S28. The processing from step S28 onward is the same as in the control process (FIG. 9) in the first embodiment.

In the present embodiment, as in the first embodiment, imaging calibration is performed on the inline scanner 30 by performing imaging and color measurement on the calibration patch at predetermined times during the printing operation (see steps S24 and S26 in FIG. 22 and step S224 in FIG.

13). This renders it possible to achieve effects similar to those achieved by the first embodiment and properly monitor the density of the printed image during the printing operation while eliminating the influence of changes in the characteristics of the printed image inspection device due to environmental changes, such as temperature changes. Note that in the present embodiment, the test pattern image for imaging calibration is formed as a part of the target printed image or outside the target printed image (FIGS. 6 and 8), so that less paper is wasted for imaging calibration.

3. THIRD EMBODIMENT

Next, a printing apparatus 10 according to a third embodiment of the present invention will be described. In the present embodiment, the test pattern images that are used for imaging calibration of the inline scanner 30 serving as the imaging portion are those shown in FIGS. 7 and 8, i.e., the test pattern images include those for shading correction on the amount of ink ejected by the recording portion 205 (such test pattern images will be referred to below as "shading correction TP images"). When the test pattern image shown in FIG. 7 is used, the entire printing apparatus operates in accordance with the procedure shown in FIG. 9, and when the test pattern image shown in FIG. 8 is used, the entire printing apparatus operates in accordance with the procedure shown in FIG. 22. The calibration data generation process in the present embodiment differs from those in the first and second embodiments in relation to shading correction. All components of the printing apparatus 10 according to the present embodiment, excluding the calibration data generation process, are the same as or correspond to those in the first and second embodiments, and therefore the same or corresponding components will be denoted by the same reference numerals and will not be elaborated upon. The calibration data generation process in the present embodiment will be described below on the premise that the test pattern image shown in FIG. 7 is used. The test pattern image includes a plurality of image strips formed to extend in the paper width direction in the same color and density and to be arranged in the transport direction in different colors with different densities.

Figure 24:
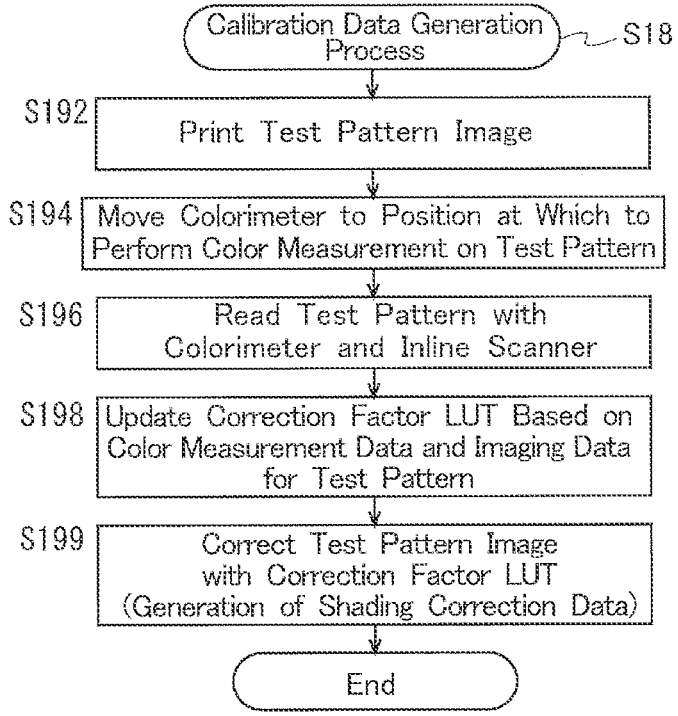
FIG. 24 is a flowchart showing a calibration data generation process in a third embodiment of the present invention.

FIG. 24 is a flowchart showing the calibration data generation process (S18) in the present embodiment. In the calibration data generation process (S18), the CPU 111 operates as described below.

First, a test pattern image (shading correction TP image) as shown in FIG. 7 is printed (step S192). Thereafter, as in the calibration data generation process (S18 in FIG. 11) in the first embodiment, a part of the test pattern image is used as a calibration patch, which is subjected to imaging and color measurement by the inline scanner 30 and the colorimeter 40, resulting in calibration imaging data and calibration colorimetric data to be used for updating the correction factor LUT (steps S194 to S198). Note that in practice, the inline scanner 30 captures the test pattern image (shading correction TP image) in FIG. 7 and thereby generates test pattern image data, and a part of the test pattern image data that corresponds to the calibration patch is used as the calibration image data. Next, the test pattern imaging data is corrected using the updated correction factor LUT, resulting in shading correction data (step S199).

After the execution of the calibration data generation process (S18), the shading correction data is used to correct the print data in the image printing process (step S220 in FIG. 9, and FIG. 12). As a result, printed images formed on the paper 5 by the recording portion 205 are inhibited from having uneven densities.

In the present embodiment, as in the first embodiment, imaging calibration is performed on the inline scanner 30 by performing imaging and color measurement on the calibration patch at predetermined times during the printing operation (see step S18 in FIG. 9 and step S224 in FIG. 13). Further, in the present embodiment, when the inline scanner 30 captures an image of the calibration patch, the inline scanner 30 captures the shading correction TP image including the calibration patch and thereby generates the test pattern imaging data, which is corrected with the correction factor LUT, resulting in the shading correction data. In this manner, capturing the test pattern image for shading correction (shading correction TP image) doubles as capturing the test pattern image for imaging calibration (and the calibration patches included therein). This renders it possible to efficiently carry out shading correction and imaging calibration during the printing operation.

4. VARIANTS AND APPLICATIONS

The present invention is not limited to the above embodiments, and various other modifications can be made without departing from the scope of the invention. For example, in the above embodiments, the present invention is applied to inkjet printing apparatuses, but the present invention can also be applied to printing apparatuses other than inkjet printing apparatuses by suitably modifying the configurations of the embodiments as necessary.

Figure 25:
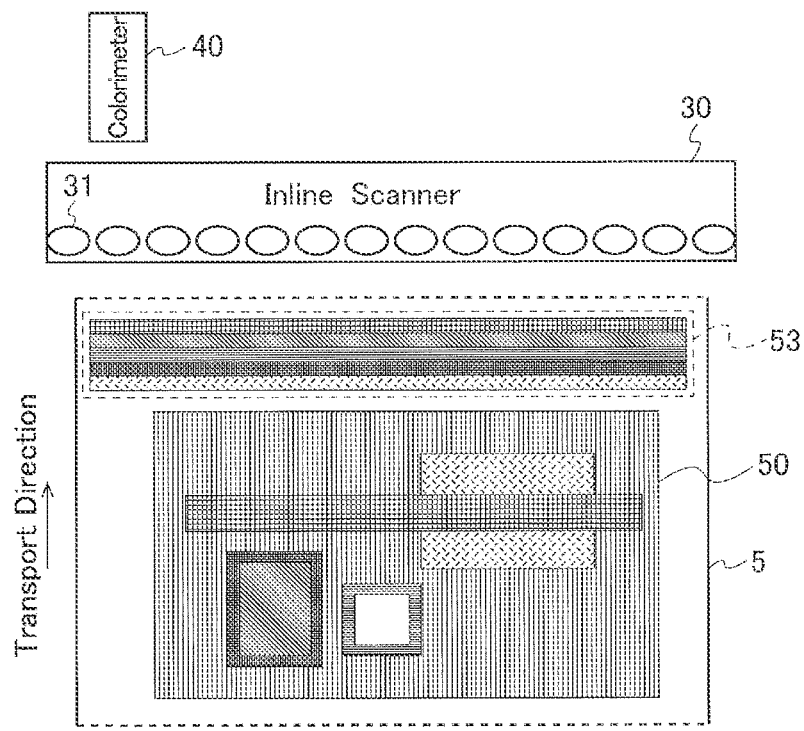
FIG. 25 is a schematic diagram showing an example of a test pattern image to be read for imaging calibration in a variant of the second embodiment, along with an inline scanner and a colorimeter.

Furthermore, if the target printed image based on the print data includes no partial image that can be used as a calibration patch in the second embodiment (see FIG. 6), a test pattern image including calibration patches may be placed outside the printed area, e.g., in a top end portion to be ultimately cut out from the paper 5, as shown in FIG. 25. In the example shown in FIG. 25, the test pattern image contains patches in colors desired to be accurately monitored and is placed outside the printed area above the target printed image 50. The test pattern image has a size that allows the inline scanner 30 and the colorimeter 40 to perform imaging and color measurement, respectively.

Figure 26:
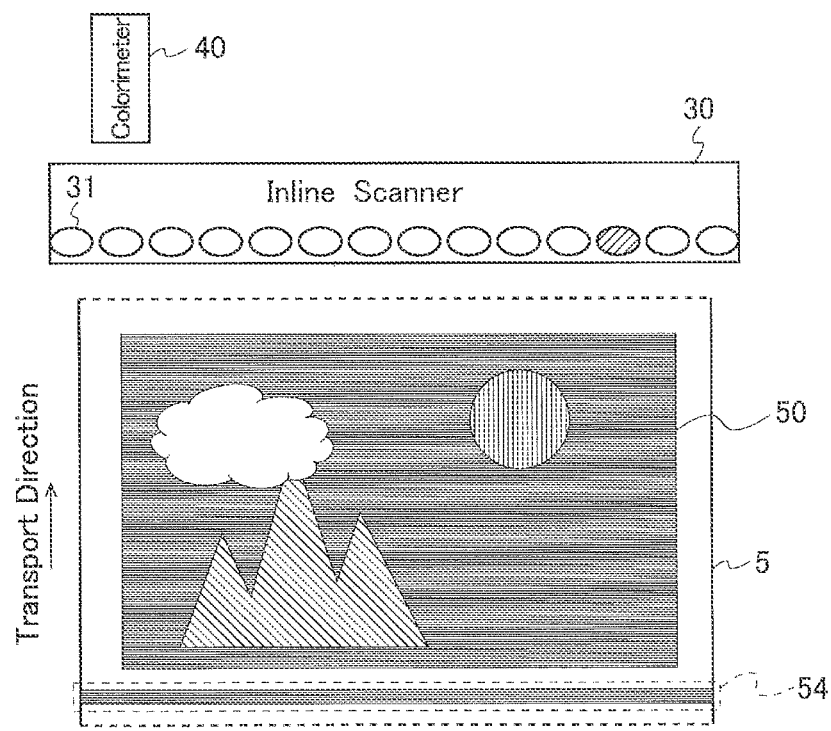
FIG. 26 is a schematic diagram showing an example of a test pattern image to be read for imaging calibration in an application of the present invention, along with an inline scanner and a colorimeter.

In each of the above embodiments, imaging calibration is performed on the inline scanner 30 during the printing operation based on the colorimetric data obtained by the colorimeter 40, and therefore the inline scanner 30 can generate imaging data with correct density values. Accordingly, when it is desired to maintain a specific color in the target printed image 50 based on the print data, for example, the printed image formed on the paper 5 includes a printhead density adjustment strip patch 54 placed outside the target printed image 50, as shown in FIG. 26. This renders it possible to correct the print data provided to the printheads with reference to data obtained by reading the patch 54 and thereby stably maintain the specific color (color of interest) in the target printed image 50.

Figure 27:
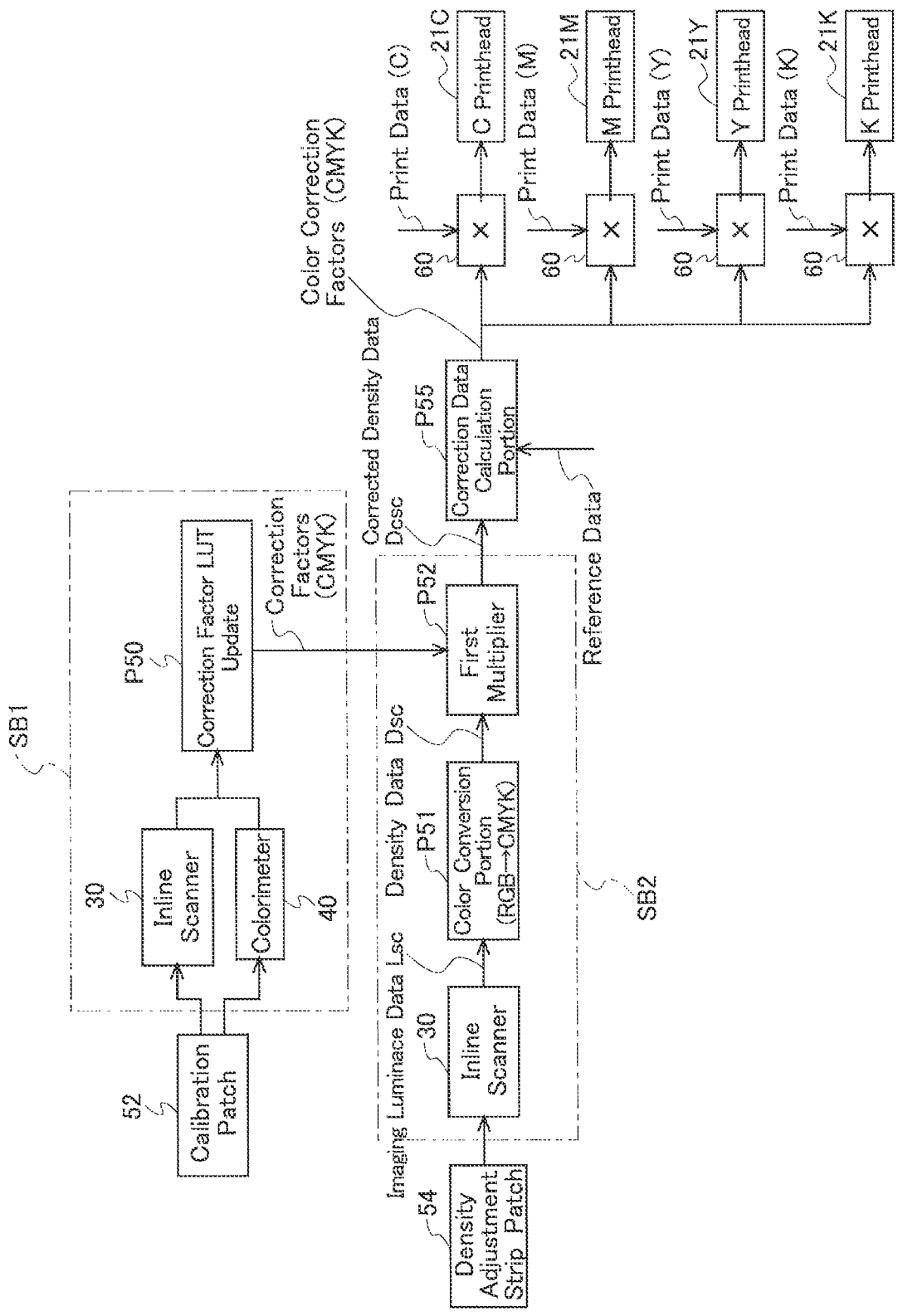
FIG. 27 is a block diagram for describing an operation for correcting density variations in the application.

FIG. 27 is a block diagram for describing an operation for correcting density variations by controlling the printheads using the density adjustment strip patch 54.

One embodiment adapted for such an application as shown in FIG. 27 includes a subblock SB1 for calculating correction factors based on a calibration patch 52 read by the inline scanner 30 and the colorimeter 40, a subblock SB2 for reading the density adjustment strip patch 54 to obtain read signals and performing the above-described imaging calibration on the read signals, a correction data calculation portion P55 for generating color correction factors for print data based on image data resulting from the imaging calibration and reference data for a color of interest, and second multipliers 60 for correcting CMYK print data through multiplication by the color correction factors and providing the corrected print data to cyan (C), magenta (M), yellow (Y), and black (K) printheads 21.

The configuration and operation of the subblock SB1 are the same as those of the equivalent portions in the embodiment as described earlier with reference to FIG. 14 and therefore will not be elaborated upon.

The subblock SB2 includes an inline scanner 30 configured to read the density adjustment stripe patch 54 and thereby output imaging luminance data Lsc for the density adjustment stripe patch 54, a color conversion portion P51 configured to convert the imaging luminance data Lsc to CMYK density data Dsc, and a first multiplier P52 configured to correct the density data Dsc through multiplication by the correction factors obtained by the subblock SB1.

The subblock SB2 performs imaging calibration for the imaging luminance data Lsc for the density adjustment stripe patch 54 outputted by the inline scanner 30. Therefore, even if the imaging sensitivity of the inline scanner 30 varies during the printing operation, the subblock SB2 can respond to such variations and output the density data Dsc for the density adjustment strip patch 54.

The correction data calculation portion P55 calculates a color correction factor for each of the CMYK colors based on the density data Dcsc resulting from imaging calibration as above and the reference data for the color of interest, such that color differences are minimized between images printed in the color of interest by the printheads 21 and the reference data for the color of interest.

These CMYK color correction factors are used by the second multipliers 60 for multiplying the respective CMYK print data thereby. The multiplication results are provided to their corresponding printheads 21 for the respective colors. The operation of correcting density variations by controlling the printheads as above allows the density of the color of interest to be stably maintained in printed images.

Note that printhead control may be performed for each printhead array, each printhead, or each nozzle. Further, the amount of ink ejected from each printhead may be controlled by the drive waveform, drive timing, or drive voltage of the printhead. Moreover, instead of controlling the printheads, the CMYK correction density values may be provided to other elements capable of printed image density adjustments. For example, density variations may be corrected by reflecting the CMYK correction density values in print data processing for shading correction or in a screening process for print data generation.

Furthermore, in the above embodiments, the correction factors are values by which to multiply the output values of the imaging elements 31. However, this is not limiting, and the correction factors may be values by which to multiply, for example, values obtained by subjecting the output values of the imaging elements to a color conversion process.

Furthermore, in FIG. 14, the color system conversion process is performed on the TP imaging luminance data Lsc resulting from imaging by the inline scanner 30. However, the color system conversion process may be performed on the TP colorimetric data Dcm resulting from color measurement by the colorimeter 40.

While the present invention has been disclosed above with reference to embodiments and variants thereof, the foregoing description is in all aspects illustrative and not restrictive. It is understood that numerous other modifications and variations can be devised without departing from the scope of the invention. Further, the embodiments and variants described above can be suitably combined within the scope of the invention without contradicting the spirit of the invention.

5. OTHERS

The present invention This application claims a priority based on Japanese Patent Application No. 2021-051102 filed on Mar. 25, 2021 and entitled "Printed Image Inspection Device and Printing Apparatus Including Same", which is incorporated herein by reference in its entirety.

What is claimed is:

1. A printed image inspection device for inspecting a printed image formed by a printing apparatus, comprising:
   an imaging portion configured to capture the printed image;
   a colorimeter configured to perform color measurement on a whole or part of the printed image;
   a calibration portion configured to perform imaging calibration on the imaging portion;
   a determination portion configured to determine the quality of the printed image; and
   an inspection control portion configured to control the imaging portion, the colorimeter, and the calibration portion, wherein,
   the inspection control portion controls the imaging portion, the colorimeter, and the calibration portion such that, when a test pattern image for imaging calibration of the imaging portion is formed as a part or whole of the printed image, the imaging portion captures the test pattern image and thereby generates test pattern imaging data, the colorimeter performs color measurement on the test pattern image and thereby generates colorimetric data, and the calibration portion generates imaging calibration data based on the test pattern imaging data and the colorimetric data,
   the inspection control portion controls the calibration portion such that, after the imaging calibration data is generated, the calibration portion corrects target imaging data based on the imaging calibration data, the target imaging data being generated by the imaging portion capturing a target printed image formed based on print data representing an input image to be printed, and
   the determination portion determines the quality of the target printed image based on the target imaging data corrected by the calibration portion.

2. The printed image inspection device according to claim 1, wherein the calibration portion includes:
   a conversion portion configured to perform a color system conversion on either the test pattern imaging data or the colorimetric data, or both such that the test pattern imaging data and the colorimetric data are matched in terms of color system;
   a difference calculation portion configured to calculate a difference between the test pattern imaging data and the colorimetric data after the color system conversion; and
   a calibration data generation portion configured to generate the imaging calibration data to be used for correcting the target imaging data so as to reduce the difference.

3. The printed image inspection device according to claim 1, wherein the inspection control portion controls the imaging portion, the colorimeter, and the calibration portion during a printing operation of the printing apparatus such that:
the imaging portion generates the test pattern imaging data anew at predetermined time intervals;
the colorimeter generates the colorimetric data anew at predetermined time intervals; and
the calibration portion generates the imaging calibration data anew at predetermined time intervals based on the test pattern image data generated anew and the colorimetric data generated anew, and thereby updates the imaging calibration data to be used for correcting the target imaging data.

4. The printed image inspection device according to claim 1, wherein the inspection control portion controls the printing apparatus such that the test pattern image is formed at a position different from a position at which the target printed image is formed.

5. The printed image inspection device according to claim 1, wherein,
the imaging portion generates the test pattern imaging data by capturing a partial image selected as the test pattern image from the target printed image,
the colorimeter generates the colorimetric data by performing color measurement on the partial image, and
the partial image has a size that allows the imaging portion and the colorimeter to perform imaging and color measurement, respectively.

6. The printed image inspection device according to claim 1, further comprising a moving mechanism configured to move the colorimeter, wherein,
the printing apparatus is configured to form a printed image on a base material while transporting the base material,
the imaging portion includes a plurality of imaging elements arranged in a width direction perpendicular to a transport direction of the base material, and
the inspection control portion causes the moving mechanism to move the colorimeter in the width direction such that the colorimeter generates colorimetric data corresponding to test pattern imaging data generated by the imaging elements.

7. A printing apparatus having a printed image inspection function, comprising:
a printing mechanism; and
a printed image inspection device of claim 1, wherein, the printing mechanism includes:
a transport mechanism configured to transport a base material;
printheads configured to print on a printing side of the base material; and
a printing control portion configured to control the printheads and the transport mechanism to form a printed image on the base material,
the transport mechanism includes first and second transport rollers partially wrapped by the base material such that the first and second transport rollers change a transport direction of the base material with the printed image,
the imaging portion is disposed with an imaging surface thereof facing the printing side of the base material at a portion where the base material is in contact with the first transport roller, and
the colorimeter is disposed with a color detection surface thereof facing the printing side of the base material at a portion where the base material is in contact with the second transport roller.

8. The printing apparatus according to claim 7, wherein, the transport mechanism is configured such that the first transport roller contacts the base material at a portion where the base material is horizontally transported, and
the imaging portion is disposed vertically above the first transport roller.

9. The printing apparatus according to claim 7, wherein the colorimeter is disposed with the color detection surface facing a portion of the printing side that corresponds to a circumferential center of the second transport roller at the portion where the base material is in contact with the second transport roller.

10. The printing apparatus according to claim 9, wherein, the transport mechanism is configured such that the second transport roller switches the transport direction of the base material from a horizontal direction to a vertical direction or vice versa, and
the colorimeter is disposed so as to lie on an oblique line extending from a point on a center axis of the second transport roller in a plane perpendicular to the center axis of the second transport roller, the oblique line being inclined relative to the vertical direction.

11. The printing apparatus according to claim 10, wherein the colorimeter is disposed with the oblique line making an angle of 30 to 60 degrees with the vertical direction.

12. The printing apparatus according to claim 7, further comprising a correction portion configured to correct the print data, wherein,
the printheads each have a plurality of nozzles arranged in a width direction perpendicular to the transport direction of the base material and eject ink from the nozzles onto the base material,
the inspection control portion controls the printheads and the transport mechanism to form an image for shading correction on the base material as the test pattern image, the image for shading correction being used to compensate for variations in amount of ink ejection among the nozzles,
the inspection control portion controls the calibration portion to correct the test pattern imaging data obtained by the imaging portion capturing the test pattern image, based on the imaging calibration data, and generate shading correction data based on the corrected test pattern imaging data,
the correction portion corrects the print data based on the shading correction data, and
the print control portion controls the printheads and the transport mechanism to form the target printed image on the base material based on the print data corrected by the correction portion.

13. A printed image inspection method for inspecting a printed image formed by a printing apparatus, comprising:
an imaging step of capturing the printed image;
a color measurement step of performing color measurement on a whole or part of the printed image;
a calibration step of performing imaging calibration on the imaging portion; and
a determination step of determining the quality of the printed image, wherein,
when a test pattern image for imaging calibration in the imaging step is formed as a part or whole of the printed image, test pattern imaging data, colorimetric data, and imaging calibration data are generated as follows:
the test pattern imaging data is generated by the test pattern image being captured in the imaging step;

the colorimetric data is generated by the test pattern image being subjected to color measurement in the color measurement step; and the imaging calibration data is generated based on the test pattern imaging data and the colorimetric data in the calibration step, after the imaging calibration data is generated, target imaging data is corrected based on the imaging calibration data in the calibration step, the target imaging data being generated in the imaging step by capturing a target printed image formed based on print data representing an input image to be printed, and the quality of the target printed image is determined in the determination step based on the target imaging data corrected in the calibration step.

* * * * *